US011397896B2

(12) United States Patent
Miyazaki

(10) Patent No.: US 11,397,896 B2
(45) Date of Patent: Jul. 26, 2022

(54) AUTONOMOUS THINKING PATTERN GENERATOR

(71) Applicant: Hiroaki Miyazaki, Yokohama (JP)

(72) Inventor: Hiroaki Miyazaki, Yokohama (JP)

( * ) Notice: Subject to any disclaimer, the term of this patent is extended or adjusted under 35 U.S.C. 154(b) by 0 days.

(21) Appl. No.: 14/902,256

(22) PCT Filed: Oct. 20, 2014

(86) PCT No.: PCT/JP2014/078837
§ 371 (c)(1),
(2) Date: Dec. 30, 2015

(87) PCT Pub. No.: WO2015/182007
PCT Pub. Date: Dec. 3, 2015

(65) Prior Publication Data
US 2016/0155051 A1 Jun. 2, 2016

(30) Foreign Application Priority Data

May 24, 2014 (JP) .............................. JP2014-119976

(51) Int. Cl.
*G06N 5/02* (2006.01)
*G06K 9/00* (2022.01)
(Continued)

(52) U.S. Cl.
CPC .............. *G06N 5/02* (2013.01); *G06F 40/205* (2020.01); *G06K 9/00496* (2013.01); *G06N 3/008* (2013.01); *G06N 20/00* (2019.01)

(58) Field of Classification Search
CPC .......... G06N 3/00; G06N 3/004; G06N 3/008; G06N 5/02; G06N 20/00; G06F 40/205; G06K 9/00496
See application file for complete search history.

(56) References Cited

U.S. PATENT DOCUMENTS 5,519,608 A * 5/1996 Kupiec ............... G06F 16/3329
704/9
6,324,513 B1 11/2001 Nagai et al.
(Continued)

FOREIGN PATENT DOCUMENTS

CN         1283428 C    11/2006
CN       202736475 U     2/2013
(Continued)

OTHER PUBLICATIONS

English language translation of Office Action (Notice of Reasons for Rejection) dated Oct. 28, 2014, by the Japanese Patent Office in corresponding Japanese Patent Application No. 2014-119976. (4 pages).

(Continued)

*Primary Examiner* — Ben M Rifkin
(74) *Attorney, Agent, or Firm* — Buchanan Ingersoll & Rooney PC

(57) ABSTRACT

An autonomous thinking pattern generator including a pattern converter configured to convert input information to patterns, the input information including image information, sound information or language, a pattern recorder configured to record the patterns, a pattern controller configured to set and change the patterns, and form connective relations between the patterns, and an information analyzer configured to evaluate values of the input information is provided. The pattern recorder is configured to record the patterns corresponding to the input information which is determined as worthy by the information analyzer autonomously.

10 Claims, 21 Drawing Sheets

(51) Int. Cl.
    *G06N 3/00*      (2006.01)
    *G06N 20/00*     (2019.01)
    *G06F 40/205*    (2020.01)

(56) References Cited

U.S. PATENT DOCUMENTS

| | | | | |
|---|---|---|---|---|
| 6,658,377 | B1* | 12/2003 | Anward | G06F 17/271 |
| | | | | 704/9 |
| 2001/0047265 | A1* | 11/2001 | Sepe, Jr. | G10L 15/22 |
| | | | | 704/275 |
| 2002/0158599 | A1 | 10/2002 | Fujita et al. | |
| 2002/0193989 | A1* | 12/2002 | Geilhufe | G10L 15/26 |
| | | | | 704/208 |
| 2003/0130976 | A1* | 7/2003 | Au | G06F 17/27 |
| | | | | 706/55 |
| 2003/0167276 | A1* | 9/2003 | Simpson | G06F 17/30864 |
| 2004/0122656 | A1* | 6/2004 | Abir | G06F 17/2872 |
| | | | | 704/4 |
| 2007/0118519 | A1 | 5/2007 | Yamasawa et al. | |
| 2008/0320087 | A1* | 12/2008 | Horvitz | H04L 67/10 |
| | | | | 709/206 |
| 2010/0312547 | A1* | 12/2010 | Van Os | G10L 15/26 |
| | | | | 704/9 |
| 2013/0017523 | A1* | 1/2013 | Barborak | G09B 7/04 |
| | | | | 434/322 |

FOREIGN PATENT DOCUMENTS

| | | |
|---|---|---|
| JP | 11-126197 A | 5/1999 |
| JP | 2001-005488 A | 1/2001 |
| JP | 2007-141090 A | 6/2007 |
| JP | 2011-221794 A | 4/2010 |
| JP | 2011-034171 A | 2/2011 |
| JP | 2011-115944 A | 6/2011 |

OTHER PUBLICATIONS

English language translation of Office Action (Notice of Reasons for Rejection) dated Jan. 6, 2015, by the Japanese Patent Office in corresponding Japanese Patent Application No. 2014-119976. (2 pages).

International Preliminary Report on Patentability and Demand (Forms PCT/IPEA/409 and PCT/IPEA/401) dated Jun. 4, 2015, by the Japanese Patent Office in corresponding International Application No. PCT/JP2014/078837. (8 pages).

International Search Report (PCT/ISA/210) dated Jan. 27, 2015, by the Japanese Patent Office as the International Searching Authority for International Application No. PCT/JP2014/078837.

Written Opinion (PCT/ISA/237) dated Jan. 27, 2015, by the Japanese Patent Office as the International Searching Authority for International Application No. PCT/JP2014/078837.

Office Action dated May 31, 2018, by the Chinese Patent Office in corresponding Chinese Patent Application No. 201480079225.9 and English translation of the Office Action. (18 pages).

Wermter et al., Stefan, "Towards Integrating Learning by Demonstration and Learning by Instruction in a Multimodal Robot", IROS-2003 Workshop on Robot Programming by Demonstration, Oct. 31, 2003, pp. 72-79, XPO55440642, ISSN: 1935-9772 (8 pages).

Wermter et al., Stefan, "Learning Robot Actions Based on Self-Organising Language Memory", Neural Networks, Elsevier Science Publishers, Barking, GB, vol. 16, No. 5-6, Jun. 1, 2003, pp. 691-699, XP004433990, ISSN: 0893-6080, DOI: 10.1016/S0893-6080(03)00100-X (9 pages).

European Extended Search Report dated Jan. 26, 2018 issued in the corresponding European Patent Application No. 14893139.7 (10 pages).

Office Action (Communication pursuant to Article 94(3) EPC) dated Mar. 13, 2019, by the European Patent Office in corresponding European Patent Application No. 14893139.7. (9 pages).

Office Action dated Mar. 28, 2019, by the Chinese Patent Office in corresponding Chinese Patent Application No. 201480079225.9 and English translation of the Office Action. (14 pages).

Office Action dated Nov. 28, 2018, by the Chinese Patent Office in corresponding Chinese Patent Application No. 201480079225.9 and English translation of the Office Action. (11 pages).

Office Action dated Sep. 4, 2019, by the Chinese Patent Office in corresponding Chinese Patent Application No. 201480079225.9 and English translation of the Office Action. (13 pages).

Office Action (Summons to attend oral proceedings pursuant to Rule 115(1) EPC) dated Feb. 12, 2020, by the European Patent Office in corresponding European Patent Application No. 14893139.7. (10 pages).

Office Action dated Feb. 23, 2021, by the Chinese Patent Office in corresponding Chinese Patent Application No. 201480079225.9 and English translation of the Office Action. (9 pages).

Office Action dated Jun. 4, 2021, by the Chinese Patent Office in corresponding Chinese Patent Application No. 201480079225.9 and English translation of the Office Action. (27 pages).

* cited by examiner

STEP1: Record the language pattern A in a memory module.
STEP2: Record the language pattern B in a memory module.
STEP3: Output the language pattern A to line 1 and activate the memory module A.
STEP4: Output the language pattern B to line 2 and activate the memory module B.

At this time, the connective relation from the memory module A to the memory module B is formed. Self-learning is performed by above steps, and the language pattern B is activated after the language pattern A is activated.

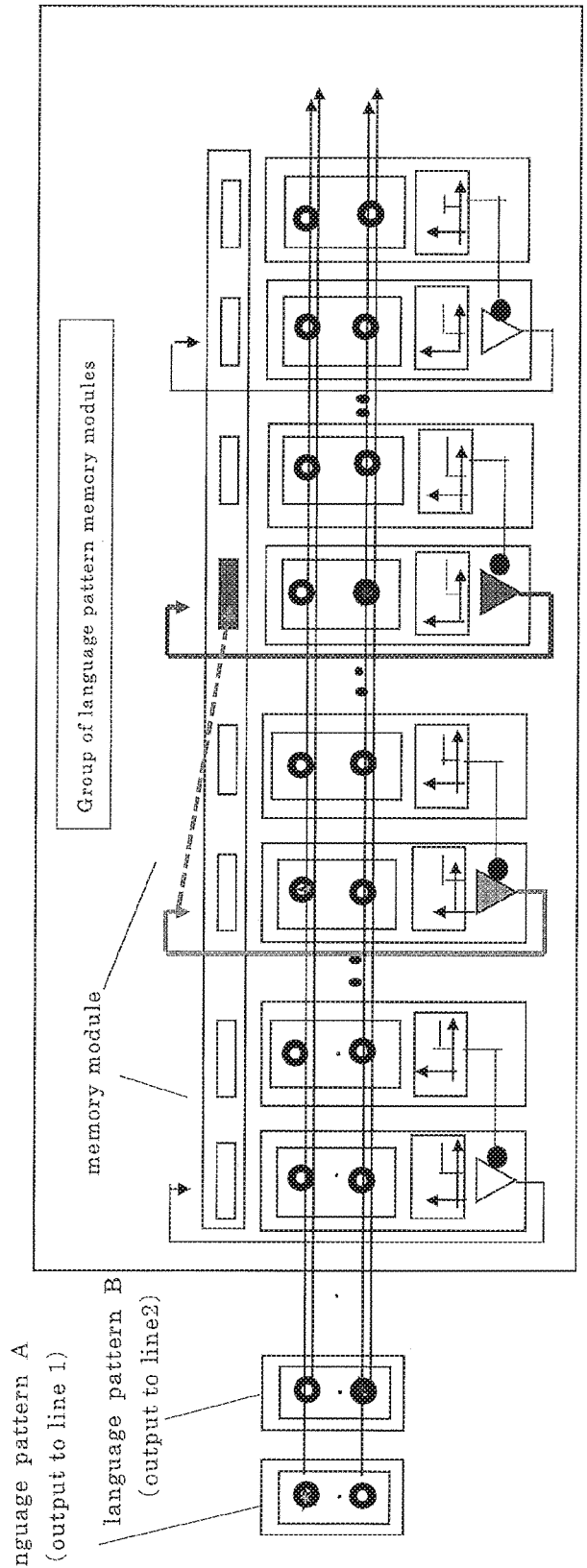

FIG.7

STEP1 : Output language pattern A1 to line 1 and activate memory module A1.
STEP2   Output language pattern C1 representing the same meaning to line 3 and activate memory module C1.
STEP3 : Output language pattern A2 having the same meaning with A1 and activate memory module A2.
(Condition that the memory module A2 activates when the memory modules A1 and C1 activate is set.)

Self-learning is performed by above steps, and the language pattern A2 is activated after the activation of A1 and C1.

Group of language pattern memory modules (simplified expression)

FIG.11

AUTONOMOUS THINKING PATTERN GENERATOR

TECHNICAL FIELD

The disclosed embodiments relate generally to intellectual machines, which learn human thinking process, and generate series of thinking patterns similar to one that human generates. The disclosed embodiments relate to intellectual machines, which expand intelligence autonomously by evaluating the worth of input information, and by recording the information which is evaluated as worthy.

BACKGROUND

The traditional intellectual machines, such as automatic machines and robots, act according to procedures specified for the conditions that are programmed. The programs are designed by humans, and installed into the machines and robots. It is not possible to update the programs by the machines and robots by themselves.

REFERENCES CITED

Patent Literature

Japanese Unexamined Patent Application Publication No. H11-126197 (Artificial Intelligence Systems)

SUMMARY

Problems to be Solved

The traditional automatic machines or robots act according to the procedures specified for the conditions that are coded with computer programs in advance. The programs are designed by humans, and need to be installed into the machines and robots. It takes huge time and costs to develop the programs, and that is a significant disadvantage.

BACKGROUND

Operation of the machine based on image information, sound information and information from the human is achieved by installing a program coded with a program language into a computer mounted on the machine in advance, and executing the same. The programs are designed to detect the conditions of the operations, and to execute the corresponding operations. If the conditions and operations are not appropriate, the humans have to correct the programs installed. Conventionally, there is no machine or robot which sets the condition and corresponding operation as patterns corresponding to the human thought, and performs an operation based on a change between the patterns.

Conventionally, there is no machine or robot which evaluates the worth of the input information, records the information which is evaluated as worthy, and expands the worthy information autonomously.

Conventionally, there is no machine which analyzes the parts of speech, distinguishes the subjects, the predicate and modifiers, and recognizes or regulates about when, where, who, what, how and why.

To make the machine to output a result derived from or associated with multiple conditional query inputs, the machine must be coded with programs of such derivational or associative operations. Those programs may be designed to detect the conditions of the operations, and to execute corresponding operations for the traditional machines. Conventionally, there is no machine which converts the condition to patterns and provides outputs as the derivation or association by connecting the patterns.

Traditional pattern recognition merely references to correlations with input signals. In traditional machines with such a pattern recognition, the function of actively avoiding wrong recognition is absent.

In the traditional machines, the correlation with the input signal is detected individually. The traditional machines fail to recognize patterns side by side using multiple comparing.

Problems to be Solved

The traditional automatic machines or robots need to be programmed in advance to operate. The programs including a program for judging a condition based on image information and sound information and a program for causing the machines to operate depending on each condition are designed by humans, and installed into a computer of the machines and robots. The programs have to be designed by a dedicated program language. It takes huge time to develop the programs, and that is a significant disadvantage. If the detection of conditions and associated operations are not appropriate, the humans have to correct the programs installed. It takes huge time to modify the programs, and that is also significant disadvantage.

When the humans record the information into the machines, the humans evaluate the worth of the information and input the worthy information into the machines. It takes huge time and costs to evaluate the worth of the information and to input the worthy information into the machines, and that is significant disadvantage.

In order to find required information from information recorded in the computer, it is necessary to input a keyword to the computer, search for related data and look into the required information. It takes huge time and that is significant disadvantage.

To make the machine to output a result derived from or associated with multiple conditional query inputs, the machine must be coded with programs of such derivational or associative operations. It takes a huge time to design the programs to satisfy such needs.

Traditional machines have disadvantages that the sensitivity of the pattern recognition increases and makes errors frequently as the learning proceeds more and more, with increasing detection gains.

The traditional machines recognize correlations with the input signal respectively and sequentially. It is difficult to recognize the correlations in parallel and simultaneously.

Solution to Solve the Problem

In some embodiments, a thinking pattern generator converts image information, sound information and language into the patterns. The image information is detected by the image sensors and converted into the patterns according to the objects. The sound information is detected by the sound sensors and converted into patterns. The language is also converted into the patterns according to the words. The patterns are expressions of the characteristics of the phenomenon which the image sensors, sound sensors distinguish, and are expressions of the languages.

The patterns converted from the image, the sound and the languages are recorded in the pattern recorder. The pattern which is recorded in the pattern recorder is connected to the other patterns according to the respective relations. For examples, a pattern A corresponds to an expression of a phenomenon A, and a pattern B corresponds to an expression of a phenomenon B. When the phenomenon A is followed by the phenomenon B, the patterns corresponding the phenomenon A and phenomenon B have connections therebetween. Then, the connective relations are set by the pattern controller to activate the pattern B following the activation of the pattern A.

For concrete examples, when the image information of "a dog" is input, an image pattern corresponding to the dog is generated and the generated pattern is recorded in the pattern recorder. Also the word corresponding to the dog is input into a language input unit as language information and converted into an organized form. Then, it is converted to a language pattern by a language pattern converter and recorded in the pattern recorder. For these two patterns, the image pattern and language pattern, corresponding to the same object, in this case the dog, a connective relation is formed by the pattern controller. Thus, when the image pattern corresponding to the dog is activated, the language pattern corresponding to the dog is activated automatically. In this way, by inputting the image of the dog to the thinking pattern generator and making the thinking pattern generator learn the language information "dog" (i.e., setting the connective relation of the patterns), the thinking pattern generator can recognize that the "dog" when it sees the dog next time.

The above is the connective relations between the image pattern and the language pattern. The connective relations between sound pattern and the language pattern can be set in a similar way.

The following explains a way to generate thinking patterns by the machines. The humans think using a language. When the humans see the phenomenon, they recognize what it is, and use the language to make opinions and to react for the phenomenon. For examples, when the humans see the traffic light at the crosswalk and the traffic light is red, they recognize that the traffic light is red and think of a language that "we have to stop when the traffic light is red." Then, the humans control their body to stop according to that thinking, and stop in front of the crosswalk. Next, when the traffic light changes to blue, they recognize that the traffic light is blue and think of a language that "we can go while paying attention to the cars when the traffic light is blue." Then, the humans control their body to walk according to that thinking, and cross the crosswalk with attention. The machines also can operate in the same way. The image pattern of the red traffic light detected by the image sensors is recorded in the pattern recorder. At the same time, the language pattern corresponding to the red traffic light is recorded in the pattern recorder too. The connective relation between the patterns is formed by the pattern controller. At first, the image pattern of the red traffic light is input. As the image pattern is already recorded in the pattern recorder, the image pattern corresponding to the red traffic light is activated. Next, the language pattern corresponding to the red traffic light is activated. And at this time, the connective relation between the image pattern and the language pattern is formed, toward the language pattern from the image pattern. Once the connective relation is formed, the next pattern is activated, following to the first pattern. For the above case, the image pattern of the red traffic light is activated first, and the language pattern is activated next, the connective relation is formed toward the language pattern from the image pattern. When the image pattern of the red traffic light is activated, the language pattern of the red traffic light is activated next automatically.

Similarly, the blue traffic light is recognized using the same way.

Next the connective relation between the language pattern and the language pattern is formed.

When the language pattern corresponding to the "red traffic light" is activated, the language pattern "stop!" is activated next, and a connective relation "read traffic light"→"stop!" is formed. Similarly, the connective relation "blue traffic light"→"go while paying attention to the cars!" is formed.

Then, the language pattern "stop" is sent to the control signal generator and the control signal generator generates a control signal to instruct actuators to "stop." The language pattern "go while paying attention to the cars!" is divided into a language pattern "detect that there is no car around" and a language pattern "go." When it is detected that there is no car around, the language pattern "go" is sent to the control signal generator and the control signal generator generates a control signal to instruct actuators to "go."

As described above, by generating the patterns in accordance with the human thinking pattern with the thinking pattern generator and operating the actuators based thereon, the machines can be controlled using the pattern "with language" as humans.

In some embodiments, a thinking pattern generator evaluates the worth of the input information. The thinking pattern generator analyzes the information about the items describing below. As a result of the analysis, the information evaluated as worthy is recorded in the pattern recorder adding the information of the analysis and the distinction of the field.

(1) Analysis about from whom the information is obtained
(2) Analysis about which field the information is related
(3) Analysis about whether the information is of interest
(4) Analysis about relationship (consistency, novelty, validity of ground) between the input information and the recorded information
(5) Analysis about a type of information (truth, fact, guess, rumor, question, order, exclamation, etc.)
(1) Analysis about from Whom the Information is Obtained The information analyzer analyzes the source of the information (book, television, human, etc.). This is achieved by checking the route of the information. For example, it is interpreted that a source of the image information of the book is the book. It is also interpreted that a source of the image information and sound information of the television is the television. A source of the image information and sound information of the humans is interpreted by identifying who is around and who is speaking.

(2) Analysis about which Field the Information is Related.

Generally, the input information contains clues such as words and sentences that lead to what field it belongs to. The clues will be found by monitoring the sentences, even if it is difficult to find the clues in the latest sentence.

The information is input into the pattern convertor, and the information is converted into the language pattern. When the human sees the information and determines that the information belongs to which field, the language pattern relating to the field is recorded in the pattern recorder. The connective relation from the language pattern corresponding to the input information to the language pattern corresponding to the field is formed. The connective relation between the language patterns are formed using a connective coefficient. When the humans evaluate the input information No. 1 belongs to a field No. 1, the connective relation using the connective coefficient from the language pattern corresponding to the input information No. 1 to the language pattern corresponding to the field No. 1 is formed. When the language pattern corresponding to the information No. 1 is activated, the connective relation to the field No. 1 is enhanced relative to the connective coefficient. Whether to activate the language pattern of the field No. 1 is determined based on a magnitude relation between the strength of the connective relation inputted through the connective coefficient and a preset threshold. By repeating the above steps for each input information, the thinking pattern generator learns field analysis of the input information. If a result of the field analysis for input information is not correct, the connective coefficient is modified so that the connective relation to the input pattern being weaker.

By learning the field repeatedly, the thinking pattern generator gets the capability to distinguish the fields correctly.

(3) Analysis about Whether the Information is of Interest

This can be achieved similarly to the way described in (2). The thinking pattern generator analyzes the interest of the information. This is achieved by checking whether the information contains the words or sentences which is of interest.

(4) Analysis about Relationship (Consistency, Novelty, Validity of Ground) Between the Input Information and the Recorded Information The input information is analyzed about the field in which it belongs to, and is compared with the patterns recorded in the pattern recorder. If the related patterns are detected, the relation with the input information is analyzed. It is possible to define the consistency and inconsistency between the language patterns recorded in the pattern recorder. For example, between the language pattern corresponding to "up" and the language pattern corresponding to "down," the connective relation of opposite meaning is formed. And, between the language pattern corresponding to "beautiful" and the language pattern corresponding to "pretty," the connective relation of the same meaning is formed. In this way, the connective relation of the opposite meaning or the same meaning can be formed between the language patterns. When the language pattern corresponding to "up" is included in the input information, information related to the input information is detected in the pattern recorder, and the language pattern corresponding to "down" is included in the language pattern of the relational information, the language pattern corresponding to "up" activates, and the language patterns corresponding to "down" also activates. Since the language pattern corresponding to "up" have the opposite relation with the language pattern corresponding to "down," it is possible to detect inconsistency between the input information and the information recorded. Similarly, when the language patterns activate which have the same meaning, such as "beautiful" and "pretty", it is possible to detect consistency of the input information with the information recorded. The humans analyze the consistency and inconsistency of the new information by comparing with the relational information recorded before. It is possible to do that using the machines.

The following explains a method to analyze a novelty of the information.

The language patterns including low-level language patterns (words for the sentence) and equative language patters which constitute the language pattern of the input information are generated. These language patterns do not affect a novelty of the input information and make a group of the language patterns having the same meaning.

Similarly, the language patterns including low-level language patterns and equative language patters which constitute the language pattern of relational information of the input information are generated. These language patterns also do not affect the novelty of the input information and make a group of the language patterns having the same meaning. It is understood that this group of the language patterns occupy a maximum areas for a meaning of the language in a meaning space constituted by words.

It is possible to evaluate whether the input information includes the novelty or not, by comparing the group of the language patterns of the input information and the group of the language patterns of the related information recorded before. When the language pattern of the new elements are detected other than the language patterns of the relational information, it is determined that there is the novelty in the information. This is because the above indicates that information not included in the relational information is included in the input information.

The following explains the method to analyze the validity of the grounds.

When the input information is converted into the language pattern and recorded, it is recommendable to convert the reasons of the information into the language pattern and record, if at all possible. For example, when we enter the information "A is B", it is recommendable to convert the reason "because A is C" into a language pattern and record as possible. By recording the reasons of the information repeatedly, the groups of language pattern which show the reasons will be constructed. By accumulating the language patterns which show the reasons based on truth, fact and common knowledge, the validity will get stronger and stronger. If the input information shows the inconsistency with the information recorded, it is very effective to compare the reasons.

By comparing the reasons of the input information and the relational information with the group of the language patterns of the reasons, it is possible to evaluate which is reasonable. If there is no matching result when comparing with the language patters of the reasons, the reason was not explained before. That is, when comparing with the language patters of the reasons, larger the number of the matching results higher the validity.

(5) Analysis about the Type of Information (Declarative Sentence (Truth, Fact, Guess, Rumor) Interrogative Sentence, Imperative Sentence, Exclamatory Sentence Etc., Etc.)

The types of the input information are analyzed. Generally, the language patterns include the patterns which suggest the types (declarative sentence, interrogative sentence, imperative sentence, exclamatory sentence etc.).
Declarative sentence: "is," "are," "was," "were," etc.
Interrogative sentence: "Is it . . . ," "Was it . . . ," "Will it . . . ," etc.
Imperative sentence: "Do . . . ," "Please do . . . ," etc.
Exclamatory sentence: "What . . . ," "How . . . ," etc.
Speculation: "It seems that . . . ," "It appears that . . . ," etc.
Rumor: "They say that . . . ," "It is said that . . . ," etc.

It is possible to distinguish the types of the information, by detecting these language patterns. In addition, it is possible to identify that the information is true and real by using the image patterns and the sound patterns besides the language patterns. It is possible to identify that the information is real when the phenomenon actually occurs in the image pattern is recorded as the language pattern. It is possible to identify that the information is true when the information is from reliable humans, books etc.

It is possible to evaluate the worth of the information by the method explained above analyses (1) to (5). The information is evaluated as worthy when it is from reliable sources and being interested, and is evaluated valueless when it is not from reliable sources and being not interested. The worthy information is recorded in the pattern recorder as the language pattern, and the information of no value is not recorded.

Accordingly, the worthy information is accumulated and the huge intelligence is constructed in the pattern recorder.

In some embodiments, a thinking pattern generator analyzes the parts of speech and distinguish the subjects, the predicate and modifiers and sorts and records about when, where, who, what, how and why. It is possible to output the necessary information by inputting what you want to know for what.

The sentence structure analyzer of the thinking pattern generator analyzes the parts of speech of the language pattern of the input information. The part of speech are associated with each words. The sentence structure analyzer analyze the part of speech and the combination thereof. For example, it is possible to recognize the subject, the predicate and the modifiers by analyzing the combinations of the parts of speech.

"noun"+"postposition (ha)"→subject
"noun"+"postposition (ga)"→subject
"noun"+"postposition (wo)"→object
"verb"→predicate
"adjective"→predicate
"adjective"+"noun"→"adjective" is the modifier of the "noun"
"noun1"+"postposition (of)"+"noun2"
    "noun1"+"postposition (of)" is the modifier of the "noun2"
"verb ( . . . sita)"+"noun"
    →"verb ( . . . sita)" is the modifier of the "noun"
"noun1"+"postposition (wo)"+"transitive verb"+ "noun2"+"postposition (of)"+"noun3"
    →(case1: "noun2" is the subject of "transitive verb")
        "noun1"+"postposition (wo)"+"transitive verb" is the modifier of "noun2"
    →(case2: "noun3" is the subject of "transitive verb")
        "noun1"+"postposition (wo)"+"transitive verb" is the modifier of "noun3"
"noun (time)"→means (when)
"noun (place)"+"postposition (at)"→means (where)
"sentence (by . . . ing)"→means (how)
"sentence (because)"→means (why)
    etc.

The sentence structure analyzer generates the language patterns and arranges the subject, the predicate and the modifiers in the appropriate places to clarify (when), (where), (who), (what), (how), (why), etc. It is possible to answer the questions by selecting the patterns located in the appropriate places. Specifically, a language pattern below is used as a language pattern for searching.

Language pattern for searching:
    (when)+(where)+(who)+(what)+(how)+(why)+(do (what))

When we want to know about (when), under the condition that we know about (where), (who), (what), (how), (why), and (do (what)), the language pattern for searching is made using the known language patterns including (where), (who), (what), (how), (why), and (do (what)). With the language pattern for searching, the language patterns in the appropriate places are searched. When there is a corresponding language pattern among (where), (who), (what), (how), (why), and (do (what)) as a result of comparison, it is selected as a candidate including an answer. When one of the candidates includes a language pattern indicates "when" for the item "when", it is the answer for the question.

Similarly, it is possible to get the answers corresponding to (where), (who), (what), (how), (why) and (do (what)), by making a language pattern for searching using items other than an item required to know, searching for the language pattern for searching with the pattern recorder, and selecting one of the searched candidates which includes information answering the question. The answer is directly obtained if the pattern recorder includes the answer for the question.

In some embodiments, a thinking pattern generator generates patterns derived from and associated with input patterns. It is assumed that "pattern A," "pattern B1," "pattern B1," . . . "pattern BN" are input patterns and "pattern C1," "pattern C1," . . . "pattern CN" are the derived and associated patterns. It is assumed that there is a relation below, between the input patterns and the derived and associated patterns.

"pattern A"+"pattern B1"→"pattern C1"
"pattern A"+"pattern B2"→"pattern C2"
．
．
．
"pattern A"+"pattern BN"→"pattern CN The pattern controller is used for this.

The "pattern Ci" is activated after the activation of the "pattern A" and "pattern Bi," (i=1N). At this time, the connections from "pattern A" and "pattern Bi" to "pattern Ci," (i=1N) are formed by the pattern controller. When the connections are formed, "pattern Ci" activates after the activation of "pattern A" and "pattern Bi." As described above, the patterns corresponding to the connections can be output by changing the connections of input pattern.

In some embodiments, a pattern recorder includes a pattern detector for detecting patterns and a wrong pattern detector for detecting wrong patterns not to be detected. According to this, the wrong pattern detector detects the wrong patterns and the wrong detection can be reduced.

In some embodiments, a pattern recorder includes a plurality of input lines and output lines. According to this, correlation with the input signal is detected with respect to each line. Thus, it is possible to perform the correlation detection in parallel and simultaneously without interferences.

DESCRIPTION OF EMBODIMENTS

Embodiment 1

FIG. 1 illustrates an exemplary configuration of the autonomous pattern generator in one embodiment of the invention. In FIG. 1, reference sign 1 denotes an image sensor which detects an image. Reference sign 2 denotes an image pattern converter which converters output of the image sensor 1 to image patterns. Reference sign 3 denotes a sound sensor which detects sound. Reference sign 4 denotes a sound pattern converter which converts an output of the sound sensor 3. Reference sign 5 denotes a language input unit to which languages are input. Reference sign 6 denotes a language pattern converter which converters the output of the language input unit 5 to language patterns. Reference sign 7 denotes a pattern recorder which records the image patterns, the sound patterns and the language patterns. Reference sign 8 denotes a pattern controller which sets and changes the patterns, and forms connective relations between patterns. Reference sign 9 denotes a control signal generator which converts the patterns to control signals. Reference sign 10 denotes an actuator which is driven by the output of the control signal generator 9.

The following explains about the operations.

The image sensor 1 generates signals corresponding to objects. These signals are input into the image pattern converter 2 and the image patterns are generated. And as the similar method, the sound sensor 3 generates signals corresponding to sounds. These signals are input into the sound pattern converter 4 and the sound patterns are generated. The language input unit 5 imports the language. The language means the words and the sentences. The language input unit 5 classifies components of the input sentence to the subject, predicate and modifier etc. The language pattern converter 6 converters the output of the language input unit 5 to the language patterns. FIG. 2, FIG. 3 and FIG. 4 illustrate examples of the image pattern, the sound pattern and the language pattern, respectively. The patterns are image information, sound information or language information converted into combinations of signals and identified respectively. In this example, the components of the pattern are expressed by "ON" and "OFF", or "1" and "0" for simplicity. Another expressions are acceptable. The patterns generated are recorded in the pattern recorder 7. The pattern controller 8 sets and changes the patterns, and forms the connective relations between the patterns.

FIG. 5 illustrates an exemplary configuration of the pattern recorder 7.

The following explains the examples of the connective relations between the patterns. For examples, a pattern A corresponds to a expression of a phenomenon A, and a pattern B corresponds to an expression of a phenomenon B. When the phenomenon A is followed by the phenomenon B, the patterns corresponding to the phenomenon A and phenomenon B have a connective relation therebetween. The connective relations are formed by the pattern controller 8 to activate the pattern B following the activation of the pattern A.

For concrete examples, when the image information of "a dog" is input, an image pattern corresponding to the dog is generated and the generated pattern is recorded in the pattern recorder 7. Additionally, the word corresponding to the dog is input into the language input unit 5 as language information and converted into an organized form. Then, it is converted to a language pattern by a language pattern converter 6 and recorded in the pattern recorder 7. After the pattern controller 8 sets the connective relations, when the image pattern corresponding to the dog is activated, the language pattern corresponding to the dog is activated automatically. In this way, by showing the image of the dog to the thinking pattern generator and making the thinking pattern generator learn the language information "dog" (i.e., setting the connective relation of the patterns), the thinking pattern generator can recognize that the "dog" when it sees the dog next time.

FIG. 6 illustrates the operation example of the pattern recorder 7.

The above is the connective relations between the image pattern and the language pattern, and the connective relations between sound pattern and the language pattern can be also formed.

For concrete examples, the sound corresponding to "a" is input into the sound sensor 3. The sound sensor 3 generates a signal corresponding to "a" from a frequency pattern of the sound, and inputs an output to the sound patterns converter 4. The sound pattern converter 4 generates a sound pattern corresponding to the sound "a."

Next, the word "a" is input into the language input unit 5, and is converted to a language pattern corresponding to "a" by the language converter 6. Then, a connective relation is formed by the pattern controller 8. Accordingly, when the sound pattern corresponding to "a" is activated, the language pattern corresponding to "a" is activated.

Similarly, the sound patterns like "i," "u," "e," "o," "ka," . . . "n" are recorded in the pattern recorder 7.

The language pattern converter 6 generates the words as language patterns by combining letters, and generates the sentences as language patterns by combining the words. The language patterns generated are recorded in the pattern recorder 7.

As described above, the language patterns are generated from the sound patterns. As the sound patterns are different among the persons who speak, it is possible to identify who is speaking by recording sound patterns with respect to each person.

The following explains the connective relations of the language patterns, and the operations thereof.

When a phenomenon occurs, the image patterns or the sound patterns are activated and corresponding language patters are also activated. At this time, the humans see the language pattern and enter relational language into the language input unit 5, and that is converted to the language pattern by the language pattern converter 6. Then the connective relations between the language patterns are formed by the pattern controller 8. The pattern controller 8 makes the connective relations from the pattern which activated former to the pattern which activated later, when the pattern activates followed by another pattern. By this method, when one pattern activate, the relational pattern activates one after another. As the humans think a theme and thinks a relational theme, it is possible that the thinking pattern generator generates the language pattern one after another. Thinking a theme by humans corresponds to that the autonomous thinking generator activates the language patterns.

FIG. 7 illustrates the connective relations between the language patterns.

The examples of the connective relations between the language patterns are as follows.

an image pattern→a name of an object recognized by an image a sound pattern→a word, a sentence recognized by a sound a sound pattern→what is making sounds (humans or animals? who? etc.)

a language pattern (a phenomenon)→a language pattern (a phenomenon caused by the phenomenon)
        (Example (scientific fact): Reacting oxygen and hydrogen→making water.)

a language pattern (a phenomenon)→a language pattern (a reaction)
        (Example (custom, etc.): meeting a person→greeting the person)

a language pattern (a phenomenon)→a language pattern (a reaction)
        (Example (rule, etc.): red traffic light at the crosswalk→stop)

a language pattern (a phenomenon)→a language pattern (a phenomenon suggested)
        (Example (prediction): dark clouds occurs→it will rain soon)

a language pattern (a question)→a language pattern (an answer)

a language pattern (a problem)→a language pattern (a method to solve the problem)
... etc.

It is possible to search for information, by activating the language patterns and relational patterns and comparing the patterns recorded in the pattern recorder 7.

For example, it is possible that the thinking pattern generator generates the answer to the question which amusement is better to do today according to the procedure shown below.

1. Set the language pattern so as to answer hiking if the weather is fine and movie if the weather is raining when a question which amusement is better to do today is made.

2. Obtain information about today's weather and record in the pattern recorder 7.

3. Search for the information about the today's weather in the pattern recorder and make an appropriate answer according to the state, when the question which amusement is better to do today is made.

As explained above, it is possible to cause the machine to perform the thinking and the operation as the humans do by generating patterns in the thinking pattern generator and operating in accordance with the thinking pattern of the humans.

Embodiment 2

FIG. 8 illustrates an exemplary configuration of the autonomous pattern generator in one embodiment of the invention. In FIG. 8, reference sign 1 denotes an image sensor which detects an image. Reference sign 2 denotes an image pattern converter which converters output of the image sensor 1 to image patterns. Reference sign 3 denotes a sound sensor which detects sound. Reference sign 4 denotes a sound pattern converter which converts an output of the sound sensor 3. Reference sign 5 denotes a language input unit to which languages are input. Reference sign 6 denotes a language pattern converter which converters the output of the language input unit 5 to language patterns. Reference sign 7 denotes a pattern recorder which records the image patterns, the sound patterns and the language patterns. Reference sign 8 denotes a pattern controller which sets and changes the patterns, and forms connective relations between patterns. Reference sign 9 denotes a control signal generator which converts the patterns to control signals. Reference sign 10 denotes an actuator which is driven by the output of the control signal generator 9. Reference sign 11 denotes an information analyzer which evaluates the value of the information.

The following explains about the operations.

The image sensor 1 generates signals corresponding to objects. These signals are input into the image pattern converter 2 and image patterns are generated. And as the similar method, the sound sensor 3 generates signals corresponding to sounds. These signals are input into the sound pattern converter 4 and sound patterns are generated. The language input unit 5 imports the language. The language pattern converter 6 converts the output of the language input unit 5 to language patterns. The patterns generated are recorded in the pattern recorder 7. The pattern controller 8 sets and changes the patterns, and forms connective relations between the patterns.

The information analyzer 11 evaluates the worth of the input information. Analysis is done for the following items (1) to (5), for example. The information analyzed in (1) to (5) is evaluated as worthy when it is from reliable sources and interesting fields, not worthy when it is from unreliable sources and of no interesting fields. The information which is evaluated as worthy is recorded in the pattern recorder 7, and not recorded when it isn't worth.

By this method, the worthy information is accumulated, and the huge intelligence is constructed in the pattern recorder 7.

(1) Analysis about from whom the information is obtained
(2) Analysis about which field the information is related
(3) Analysis about whether the information is of interest
(4) Analysis about relationship (consistency, novelty, validity of ground) of the information with the recorded information
(5) Analysis about the type of information (truth, fact, guess, rumor, question, order, exclamation, etc.)

(1) Analysis about from Whom the Information is Obtained

The information analyzer 11 analyzes the source of the information (book, television, human, etc.). This is achieved by checking the route of the information. For example, it is interpreted that a source of the image information of the book is the book. It is also interpreted that a source of the image information and sound information of the television is the television. A source of the image information and sound information of the humans is interpreted by identifying who is around and who is speaking.

(2) Analysis about which Field the Information is Related.

Generally, the input information contains clues such as words and sentences that lead to what field it belongs to. The clues will be found by monitoring the sentences, even if it is difficult to find the clues in the latest sentence.

The information is input into the pattern convertor, and the information is converted into the language pattern. When the human sees the information and determines that the information belongs to which field, the language pattern relating to the field is recorded in the pattern recorder. The connective relation from the language pattern corresponding to the input information to the language pattern corresponding to the field is formed. The connective relation between the language patterns are formed using a connective coefficient. When the humans evaluate the input information No. 1 belongs to a field No. 1, the connective relation using the connective coefficient from the language pattern corresponding to the input information No. 1 to the language pattern corresponding to the field No. 1 is formed. When the language pattern corresponding to the information No. 1 is activated, the connective relation to the field No. 1 is enhanced relative to the connective coefficient. Whether to activate the language pattern of the field No. 1 is determined based on a magnitude relation between the strength of the connective relation inputted through the connective coefficient and a preset threshold. By repeating the above steps for each input information, the thinking pattern generator learns field analysis of the input information. If a result of the field analysis for input information is not correct, the connective coefficient is modified so that the connective relation to the input pattern being weaker.

By learning the field repeatedly, the thinking pattern generator gets the capability to distinguish the fields correctly. FIG. 9 illustrates the operation of the information analyzer 11 which analyzes the field of the information related.

(3) Analysis about Whether the Information is of Interest

This can be achieved similarly to the way described in (2). The thinking pattern generator analyzes the interest of the information. This is achieved by checking whether the information contains the words or sentences which is of interest.

(4) Analysis about Relationship (Consistency, Novelty, Validity of Ground) Between the Input Information and the Recorded Information The input information is analyzed about the field in which it belongs to, and is compared with the patterns recorded in the pattern recorder. If the related patterns are detected, the relation with the input information is analyzed. It is possible to define the consistency and inconsistency between the language patterns recorded in the pattern recorder. For example, between the language pattern corresponding to "up" and the language pattern corresponding to "down," the connective relation of opposite meaning is formed. And, between the language pattern corresponding to "beautiful" and the language pattern corresponding to "pretty," the connective relation of the same meaning is formed. In this way, the connective relation of the opposite meaning or the same meaning can be formed between the language patterns. When the language pattern corresponding to "up" is included in the input information, information related to the input information is detected in the pattern recorder, and the language pattern corresponding to "down" is included in the language pattern of the relational information, the language pattern corresponding to "up" activates, and the language patterns corresponding to "down" also activates. Since the language pattern corresponding to "up" have the opposite relation with the language pattern corresponding to "down," it is possible to detect inconsistency between the input information and the information recorded. Similarly, when the language patterns activate which have the same meaning, such as "beautiful" and "pretty", it is possible to detect consistency of the input information with the information recorded. The humans analyze the consistency and inconsistency of the new information by comparing with the relational information recorded before. It is possible to do that using the machines.

FIG. 10 illustrates the operation of the information analyzer 11 about the detection of consistency and inconsistency.

The following explains a method to analyze a novelty of the information.

The language patterns including low-level language patterns (words for the sentence) and equative language patters which constitute the language pattern of the input information are generated. FIG. 11 and FIG. 12 illustrate the examples of analysis about the detection of the same meanings. These language patterns do not affect a novelty of the input information and make a group of the language patterns having the same meaning.

Similarly, the language patterns including low-level language patterns and equative language patters which constitute the language pattern of relational information of the input information are generated. These language patterns also do not affect the novelty of the input information and make a group of the language patterns having the same meaning. It is understood that this group of the language patterns occupy a maximum areas for a meaning of the language in a meaning space constituted by words. FIG. 13 illustrates an exemplary configuration of the group which consists of the same meanings.

It is possible to evaluate whether the input information includes the novelty or not, by comparing the group of the language patterns of the input information and the group of the language patterns of the related information recorded before. When the language pattern of the new elements are detected other than the language patterns of the relational information, it is determined that there is the novelty in the information. This is because the above indicates that information not included in the relational information is included in the input information.

FIG. 14 illustrates the operation of the information analyzer 11 about the detection of novelty.

The following explains the method to analyze the validity of the grounds.

When the input information is converted into the language pattern and recorded, it is recommendable to convert the reasons of the information into the language pattern and record, if at all possible. For example, when we enter the information "A is B", it is recommendable to convert the reason "because A is C" into a language pattern and record as possible. By recording the reasons of the information repeatedly, the groups of language pattern which show the reasons will be constructed. By accumulating the language patterns which show the reasons based on truth, fact and common knowledge, the validity will get stronger and stronger. If the input information shows the inconsistency with the information recorded, it is very effective to compare the reasons.

By comparing the reasons of the input information and the relational information with the group of the language patterns of the reasons, it is possible to evaluate which is reasonable.

If there is no matching result when comparing with the language patters of the reasons, the reason was not explained before. That is, when comparing with the language patters of the reasons, larger the number of the matching results higher the validity.

(5) Analysis about the Type of Information (Declarative Sentence (Truth, Fact, Guess, Rumor) Interrogative Sentence, Imperative Sentence, Exclamatory Sentence Etc., Etc.)

The types of the input information are analyzed. Generally, the language patterns include the patterns which suggest the types (declarative sentence, interrogative sentence, imperative sentence, exclamatory sentence etc.).
Declarative sentence: "is," "are," "was," "were," etc.
Interrogative sentence: "Is it . . . ," "Was it . . . ," "Will it . . . ," etc.
Imperative sentence: "Do . . . ," "Please do . . . ," etc.
Exclamatory sentence: "What . . . ," "How . . . ," etc.
Speculation: "It seems that . . . ," "It appears that . . . ," etc.
Rumor: "They say that . . . ," "It is said that . . . ," etc.

It is possible to distinguish the types of the information, by detecting these language patterns. In addition, it is possible to identify that the information is true and real by using the image patterns and the sound patterns besides the language patterns. It is possible to identify that the information is real when the phenomenon actually occurs in the image pattern is detected and recorded as the language pattern. It is possible to identify that the information is true when the information is from reliable humans, books etc.

It is possible to evaluate the worth of the information by the method explained above analyses (1) to (5). The information is evaluated as worthy when it is from reliable sources and being interested, and is evaluated valueless when it is not from reliable sources and being not interested. The worthy information is recorded in the pattern recorder as the language pattern, and the information of no value is not recorded.

Accordingly, the worthy information is accumulated and the huge intelligence is constructed in the pattern recorder.

FIG. 15 illustrates the operation of the detection and recording of the worthy information.

Embodiment 3

FIG. 16 illustrates an exemplary configuration of the autonomous pattern generator in one embodiment of the invention.

In the FIG. 16, reference sign 1 denotes an image sensor which detects an image. Reference sign 2 denotes an image pattern converter which converters output of the image sensor 1 to image patterns. Reference sign 3 denotes a sound sensor which detects sound. Reference sign 4 denotes a sound pattern converter which converts an output of the sound sensor 3. Reference sign 5 denotes a language input unit to which languages are input. Reference sign 6 denotes a language pattern converter which converters the output of the language input unit 5 to language patterns. Reference sign 7 denotes a pattern recorder which records the image patterns, the sound patterns and the language patterns. Reference sign 8 denotes a pattern controller which sets and changes the patterns, and forms connective relations between patterns. Reference sign 9 denotes a control signal generator which converts the patterns to control signals. Reference sign 10 denotes an actuator which is driven by the output of the control signal generator 9. Reference sign 12 denotes a sentence structure analyzer which analyzes the parts of speech, the subjects, the predicates, the modifiers, when, where, who, what, how, why, do (what)) and arrange into the appropriate structure. Reference sign 13 denotes an information surveyor which extracts the searching information from the pattern recorder 7.

The following explains about the operations.

In this embodiments, the thinking pattern generator analyzes the parts of speech and distinguish the subjects, the predicate and modifiers and sorts and records about when, where, who, what, how and why. It is possible to output the necessary information by inputting what you want to know for what.

The sentence structure analyzer 12 of the thinking pattern generator analyzes the parts of speech of the language pattern of the input information. The part of speech are associated with each words. The sentence structure analyzer 12 analyzes the part of speech and the combination thereof. For example, it is possible to recognize the subject, the predicate and the modifiers by analyzing the combinations of the parts of speech.

"noun"+"postposition (ha)"→subject
"noun"+"postposition (ga)"→subject
"noun"+"postposition (wo)"→object
"verb"→predicate
"adjective"→predicate
"adjective"+"noun"→"adjective" is the modifier of the "noun"
"noun1"+"postposition (of)"+"noun2"
  →"noun1"+"postposition (of)" is the modifier of the "noun2"
"verb ( . . . sita)"+"noun"
  →"verb ( . . . sita)" is the modifier of the "noun"
"noun1"+"postposition (wo)"+"transitive verb"+ "noun2"+"postposition (of)"+"noun3"
  →(case1: "noun2" is the subject of "transitive verb")
    "noun1"+"postposition (wo)"+"transitive verb" is the modifier of "noun2"
  →(case2: "noun3" is the subject of "transitive verb")
    "noun1"+"postposition (wo)"+"transitive verb" is the modifier of "noun3"
"noun (time)"→means (when)
"noun (place)"+"postposition (at)"→means (where)
"sentence (by . . . ing)"→means (how)
"sentence (because)"→means (why)
etc.

The sentence structure analyzer 12 generates the language patterns and arranges the subject, the predicate and the modifiers in the appropriate places to clarify (when), (where), (who), (what), (how), (why), etc.

FIG. 17 shows an example of the language pattern which is arranged into the structure of the subjects, the predicates and modifiers.

It is possible to answer the questions by selecting the patterns located in the appropriate places.

The following language pattern for searching is generated by the information surveyor 13.

Language pattern for searching:
  (when)+(where)+(who)+(what)+(how)+(why)+(do (what))

When we want to know about (when), under the condition that we know about (where), (who), (what), (how), (why), and (do (what)), the language pattern for searching is made using the known language patterns including (where), (who), (what), (how), (why), and (do (what)). With the language pattern for searching, the language patterns in the appropriate places are searched. When there is a corresponding language pattern among (where), (who), (what), (how), (why), and (do (what)) as a result of comparison, it is selected as a candidate including an answer. When one of the candidates includes a language pattern indicates "when" for the item "when", it is the answer for the question.

Similarly, it is possible to get the answers corresponding to (where), (who), (what), (how), (why) and (do (what)), by making a language pattern for searching by the information surveyor 13 using items other than an item required to know, searching for the language pattern for searching in the pattern recorder 7, and selecting one of the searched candidates which includes information answering to the question.

The answer is directly obtained if the pattern recorder includes the answer for the question.

Embodiment 4

FIG. 18 illustrates an exemplary configuration of the autonomous pattern generator in one embodiment of the invention.

In FIG. 18, reference sign 1 denotes an image sensor which detects an image. Reference sign 2 denotes an image pattern converter which converters output of the image sensor 1 to image patterns. Reference sign 3 denotes a sound sensor which detects sound. Reference sign 4 denotes a sound pattern converter which converts an output of the sound sensor 3. Reference sign 5 denotes a language input unit to which languages are input. Reference sign 6 denotes a language pattern converter which converters the output of the language input unit 5 to language patterns. Reference sign 7 denotes a pattern recorder which records the language patterns. Reference sign 8 denotes a pattern controller which sets and changes the patterns, and forms connective relations between patterns. Reference sign 9 denotes a control signal generator which converts the patterns to control signals. Reference sign 10 denotes an actuator which is driven by the output of the control signal generator 9. Reference sign 11 denotes an information analyzer which evaluates the value of the information.

In this embodiment, the thinking pattern generator generates patterns derived from and associated with input patterns. It is assumed that "pattern A," "pattern B1," "pattern B1," . . . "pattern BN" are input patterns and "pattern C1," "pattern C1," . . . "pattern CN" are the derived and associated patterns. It is assumed that there is a relation below, between the input patterns and the derived and associated patterns.

"pattern A"+"pattern B1"→"pattern C1"
"pattern A"+"pattern B2"→"pattern C2"
•
"pattern A"+"pattern Bi"→"pattern Ci"
•
•
"pattern A"+"pattern BN"→"pattern CN"

The pattern controller 8 is used for this.

The "pattern Ci" is activated after the activation of the "pattern A" and "pattern Bi," (i=1N). At this time, the connections from "pattern A" and "pattern Bi" to "pattern Ci," (i=1N) are formed by the pattern controller. When the connections are formed, "pattern Ci" activates after the activation of "pattern A" and "pattern Bi." As described above, the patterns corresponding to the connections can be output by changing the connections of input pattern. FIG. 19 shows an example of outputs corresponding to the input patterns.

Embodiment 5

FIG. 20 illustrates an exemplary configuration of the autonomous pattern generator for one embodiment. In the FIG. 20, reference sign 14 denotes a pattern. Reference sign 15 is an active side pattern detector which detects patterns. Reference sign 16 denotes an active side threshold. Reference sing 17 denotes a module active part unit which indicates an activity of a memory module when the signal detected by the detector exceeds the threshold. Reference sing 18 denotes an active side connection generator which forms connections between the memory modules. Reference sign 19 denotes an active side pattern recorder which records pattern activating the modules.

Reference sign 20 denotes a suppressive side pattern detector which detects patterns which is detected by mistake. Reference sign 21 denotes a suppressive side threshold. Reference sign 22 denotes a wrong detection suppressing unit which suppresses an activity of the memory module which is going to activate by mistake. Reference sign 23 denotes a suppressive side connection generator which forms the connective relations between the memory modules. Reference sign 24 denotes a suppressive side pattern recorder which records wrong patterns activated by the active side pattern detector by mistake.

The following explains about the operations.

The connection factors of the active side pattern detector 15 are set so that correlation with the pattern 14 exceeds the active side threshold when the active side pattern detector 15 detects the pattern 14. When the pattern 14 is input after the connection factors are set, the signal from the active side pattern detector 15 exceeds the active side threshold, the module active part 17 activates and it is shown that the module is activated.

If the signal from the active side pattern detector 15 exceeds the active side threshold by the input pattern by which the module should not be activated, it is notified by a control signal that the detection is wrong. At this time, the connection factors of the suppressive side pattern detector 20 are set so that correlation with the input pattern exceeds the suppressive side threshold. According to this, the wrong detection suppressing unit 22 operates, and the wrong detection can be avoided. The patterns 14 detected at the module and the patterns mistakenly detected by the active side pattern detector 15 are recorded in the active side pattern recorder 19 and the suppressive side pattern recorder 24, respectively. These patterns are used to confirm that the detection operates correctly when the connection factors of the active side pattern detector 15 and the suppressive side pattern detector 20 are changed.

Embodiment 6

FIG. 21 illustrates an exemplary configuration of the pattern recorder for one embodiment of the invention which is free of interferences by multiple inputs. In the FIG. 21, reference sign 25 denotes an input pattern A. Reference sign 26 denotes an input pattern B. Reference sign 27 denotes input lines to the pattern recorder 7. Reference sign 28 denotes output lines of the pattern recorder 7.

In the FIG. 22, two lines are shown but it is possible to add more lines if necessary.

The correlation is calculated line by line in the pattern detector. The pattern A is transmitted in one line and the correlations are calculated in the pattern detector, and the pattern B is transmitted in other line and correlations are also calculated by the pattern detectors. Thus, an activation and inactivation are mixed in the same module depending on patterns transmitted in the input lines 27. When the module activates, the pattern in the module is output to the output lines 28.

As described above, in the present embodiment, the multiple correlations are calculated without interference with each other, and the outputs of the activated module are performed without interference with each other.

Effect of the Invention

According to the invention 1, it is not necessary to install programs into the machines, when the humans want to operate the machines.

By using the pattern converter which converts the image information, the sound information and the language to the corresponding patterns, the pattern recorder which records patterns, the pattern controller which sets and changes patterns and forms the connective relations between the patterns, and the control signal generator which converters the patterns to control signals, it is possible that the machines learn the thinking processes of the humans and operate appropriately under the situations.

According to the invention 2, it is not necessary to input the information by evaluating the worth of the information one after another into the machines, when the humans want to record the worthy information.

By using the pattern converter which converts the image information, the sound information and the language to the corresponding patterns, the pattern recorder which records patterns, the pattern controller which sets and changes patterns and forms the connective relations between the patterns, and the information analyzer which analyze the value of the information, it is possible that the machines accumulate the worthy information automatically.

According to the invention 3, it is not necessary to enter the key words in the computer, search for the relational data, and look into the necessary information to find the necessary information from the information recorded in the machine.

By using the sentence construction analyzer which analyzes and arranges when, where, what, how, why, do(what), the pattern recorder which records the patterns generated by the sentence construction analyzer, and the information surveyor which extracts the searching information from the information recorded in the pattern recorder, it is possible that the machine generates direct answers to the questions.

According to the invention 4, it is not necessary to set the programs in the computer of the machine to output derived or associated results from multiple conditions input into the machines.

By using the pattern recorder which records the patterns and the pattern controller which generates the derived or associated patterns from the multiple input patterns, it is possible that the combination of the input pattern is changed, and the machine outputs the appropriate patterns corresponding to the combination of the input patterns.

According to the invention 5, it is possible to identify the patterns rightly since the wrong identifications which assumes to be increased according to the progress of learning the patterns is suppressed.

According to the invention 6, it is possible to perform the pattern processing side by side, because the interference is avoided even if multiple input patterns are input. It is possible to perform pattern transitions independently by setting one pattern to one input line, and other pattern to other input line. It is possible to perform the pattern processing side by side, whereas it is difficult to perform it by conventional computing.

BRIEF DESCRIPTION OF THE DRAWING

FIG. 7 shows an exemplary operation of the connective relations between the language patterns.

FIG. 11 shows an exemplary operation of the information analyzer (Analysis of the same meaning) (1/2).

Figure 1:
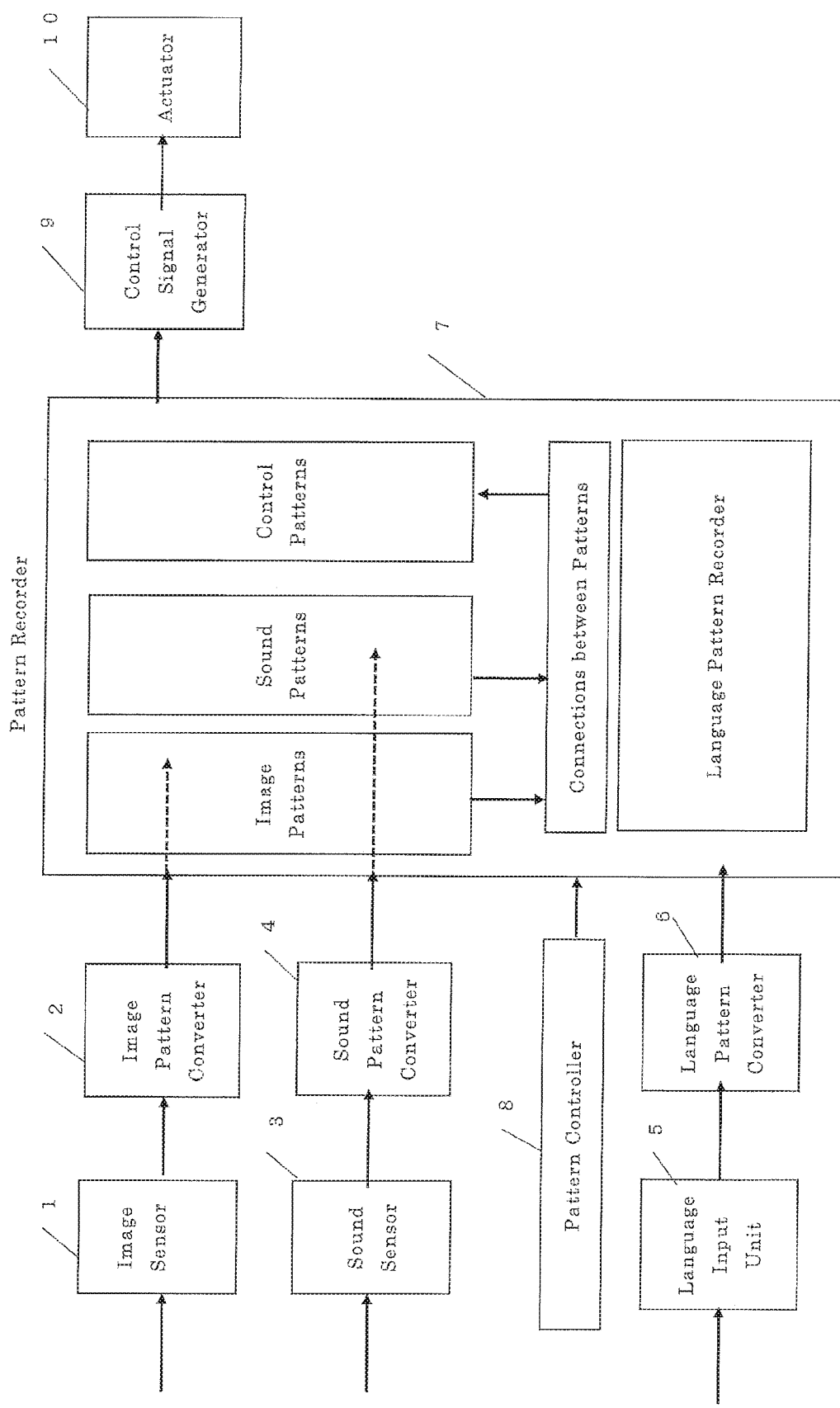
FIG. 1 shows an exemplary construction of the thinking pattern generator (Claim 1).
Figure 2:
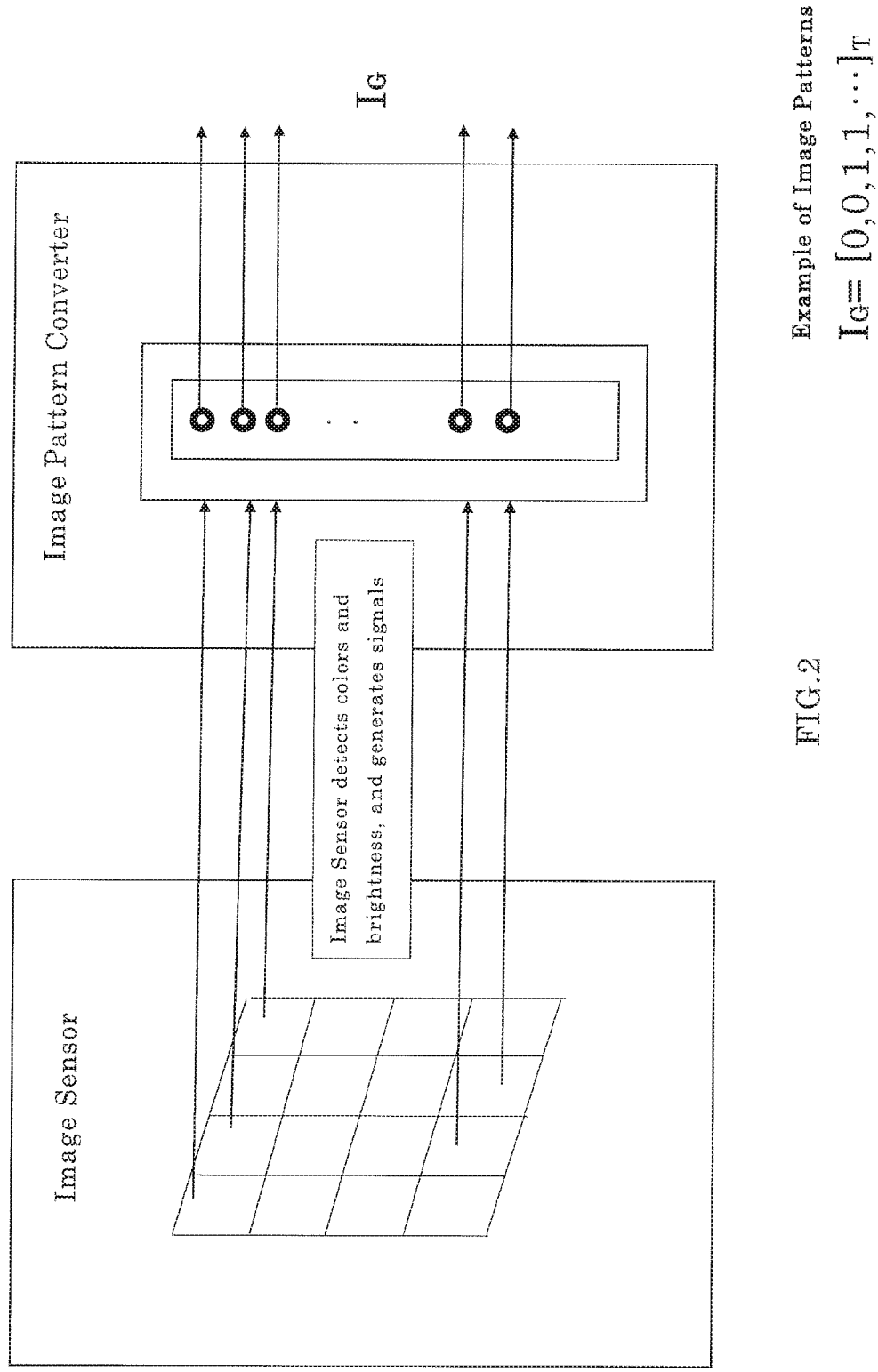
FIG. 2 shows an exemplary construction of the image pattern converter.
Figure 3:
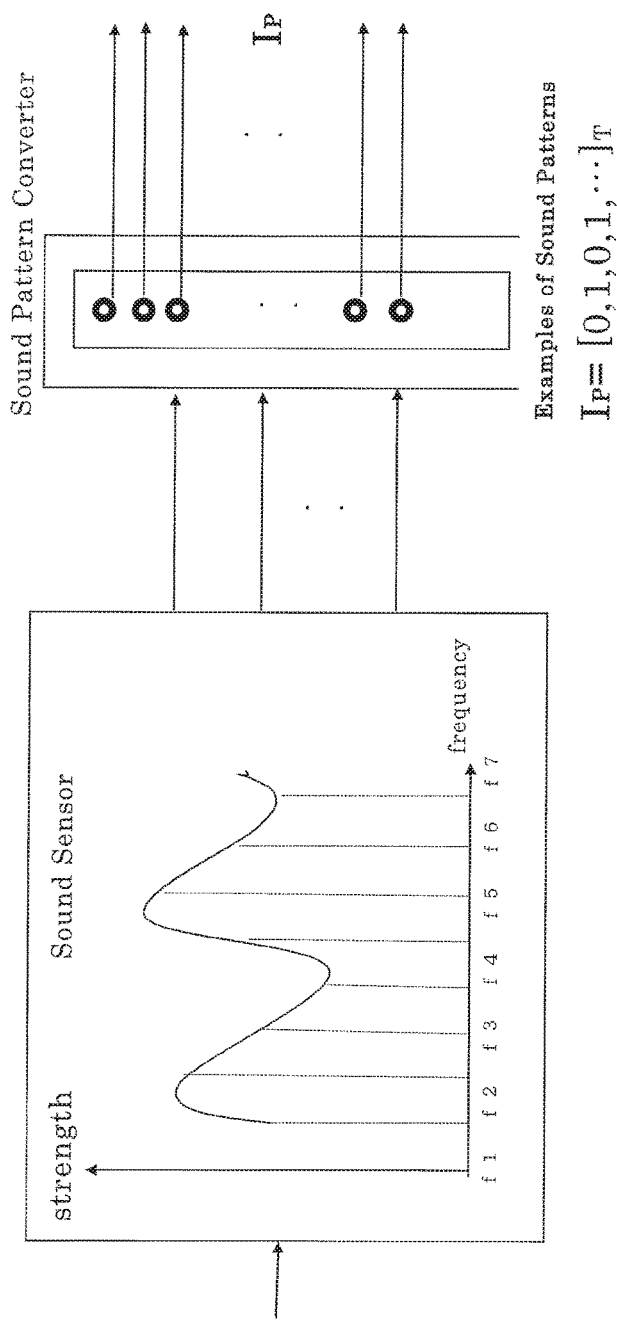
FIG. 3 shows an exemplary construction of the sound pattern converter.
Figure 4:
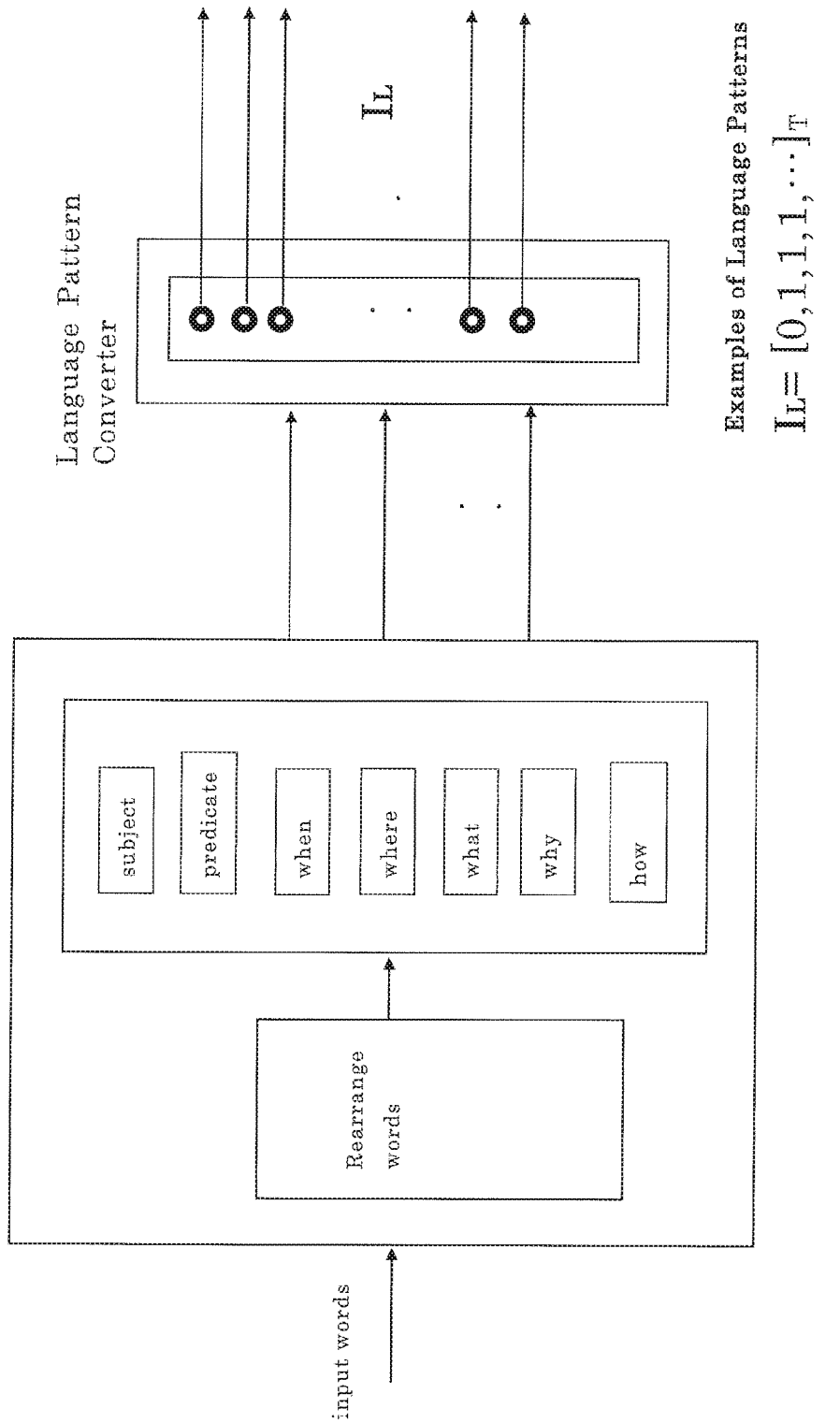
FIG. 4 shows an exemplary construction of the language pattern converter.
Figure 5:
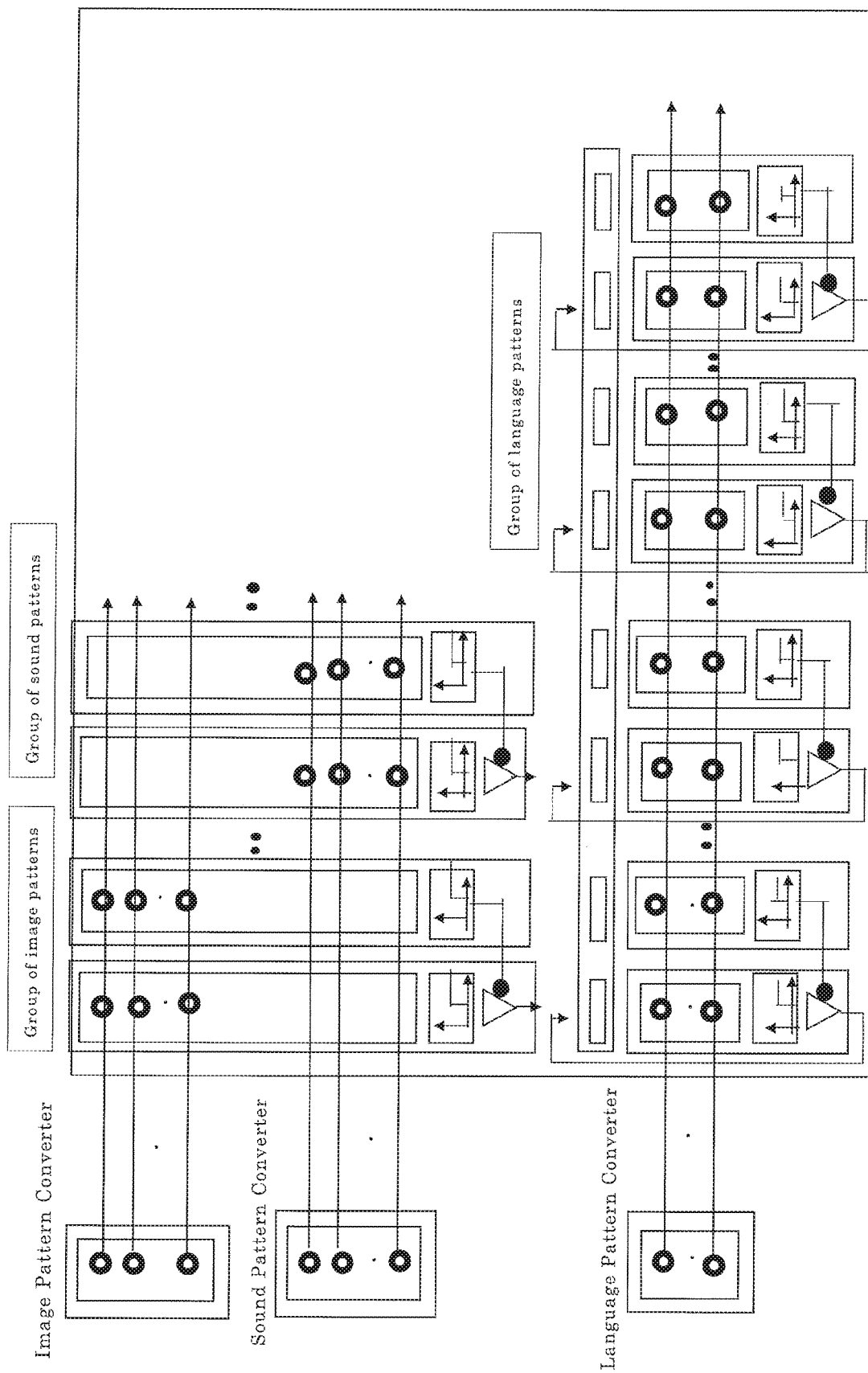
FIG. 5 shows an exemplary construction of the pattern recorder.
Figure 6:
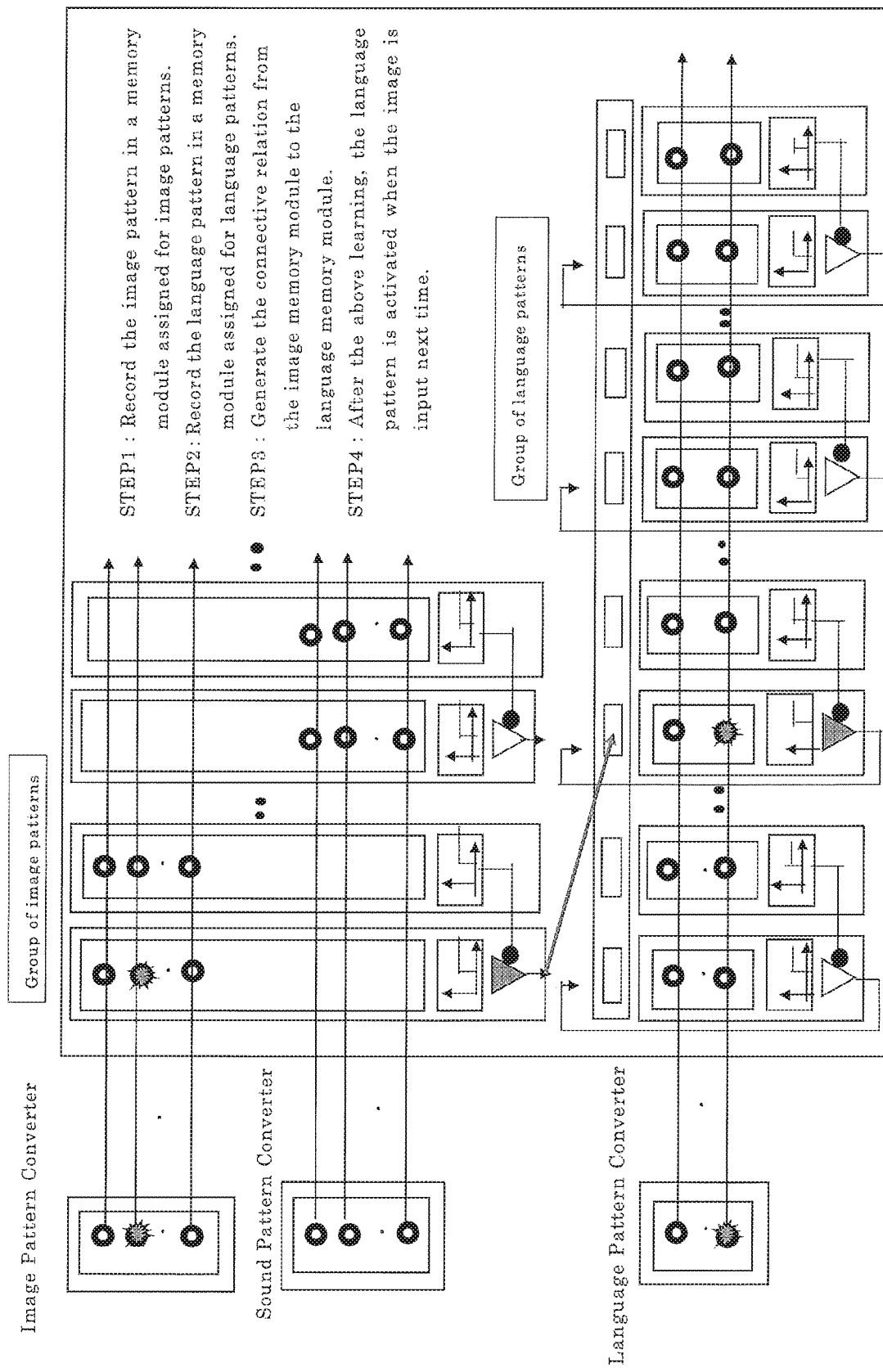
FIG. 6 shows an exemplary operation of the pattern recorder.
Figure 8:
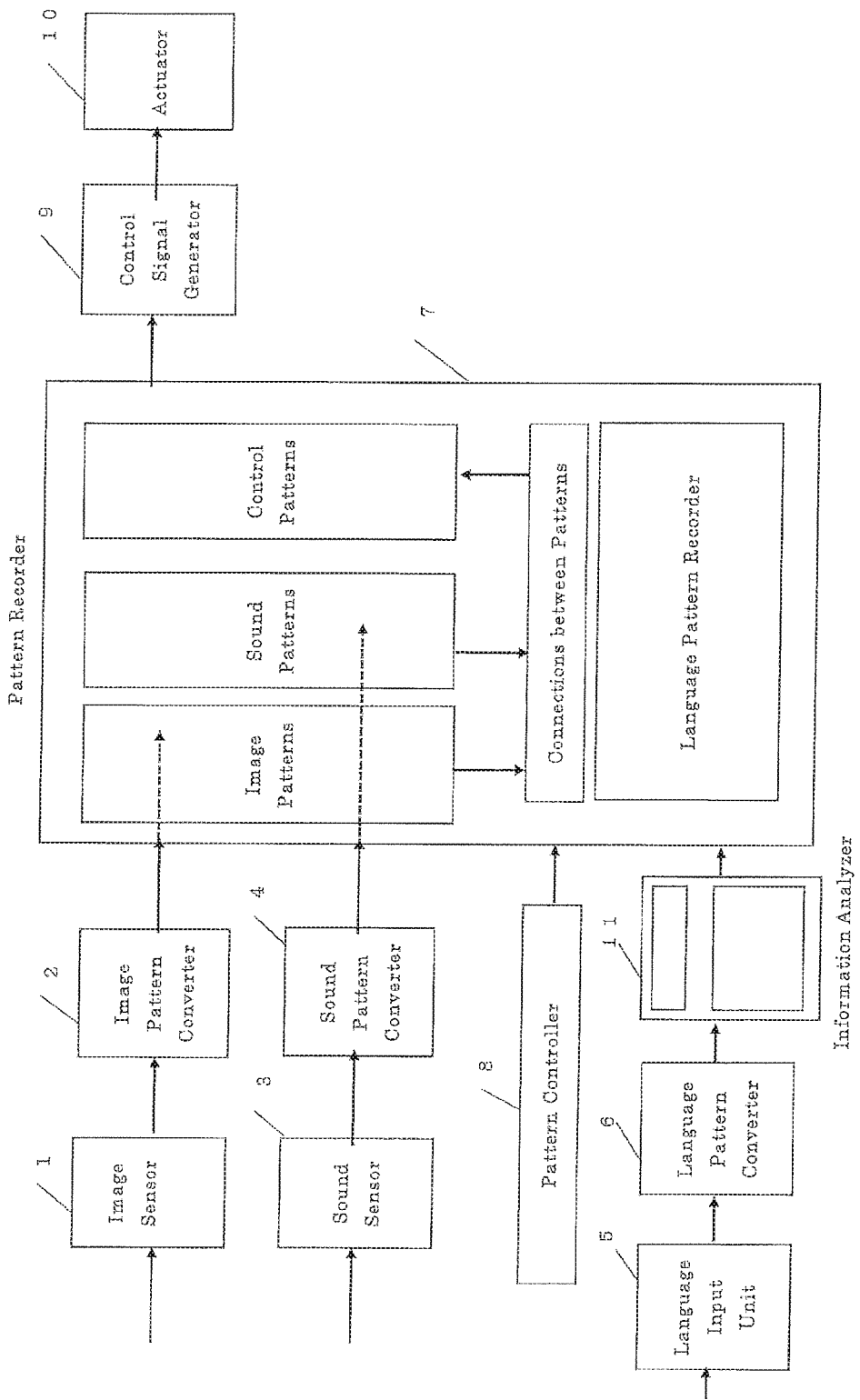
FIG. 8 shows an exemplary construction of the thinking pattern generator (Claim 2).
Figure 9:
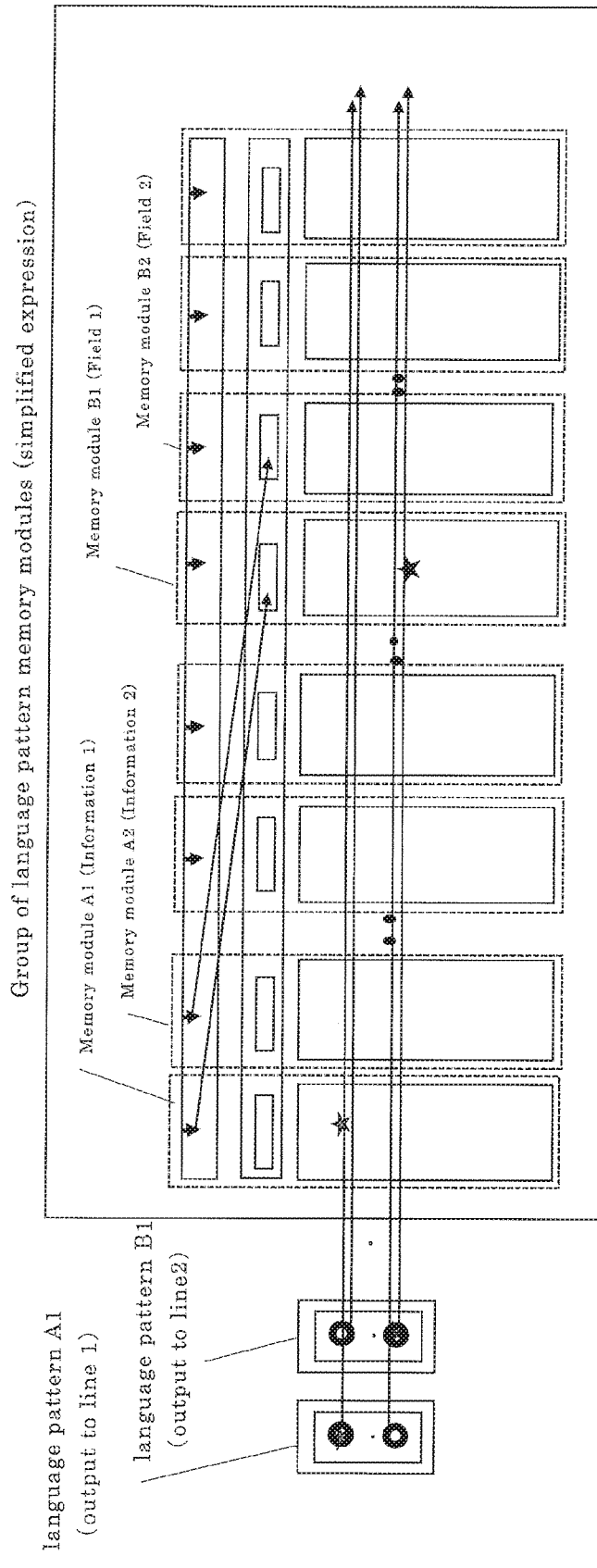
FIG. 9 shows an exemplary operation of the information analyzer (Fields analysis).
Figure 10:
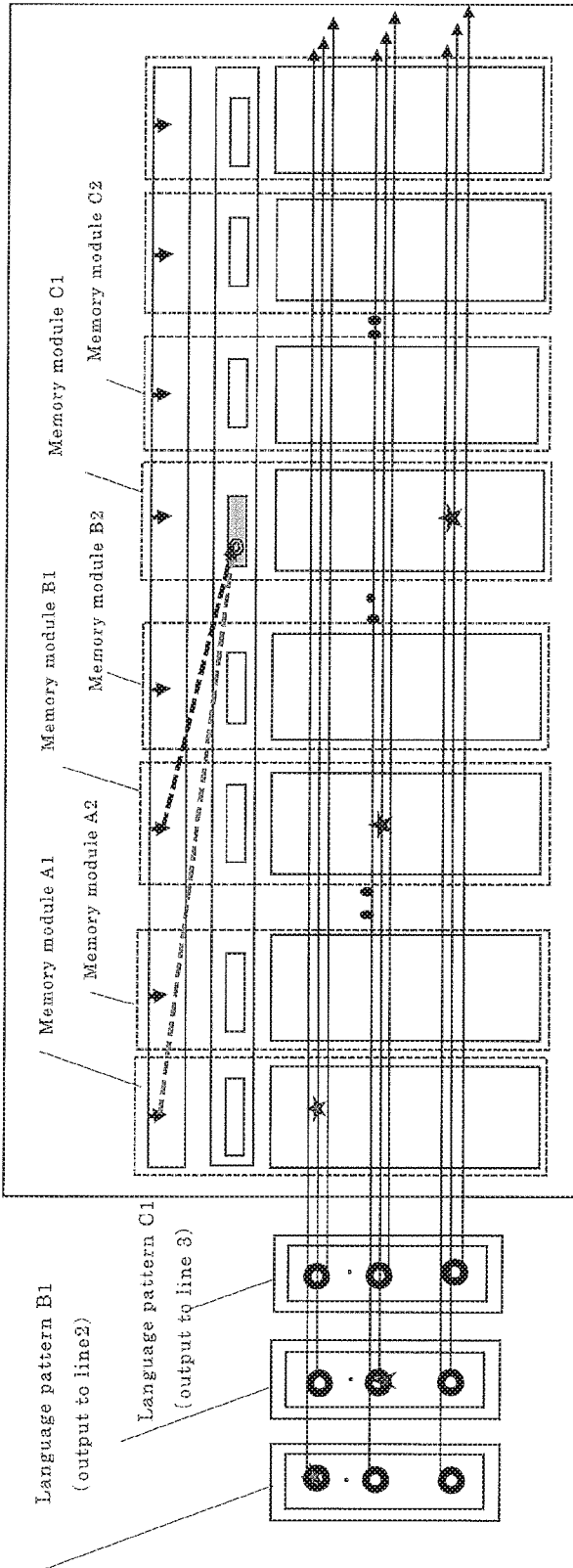
FIG. 10 shows an exemplary operation of the information analyzer (Consistency analysis).
Figure 12:
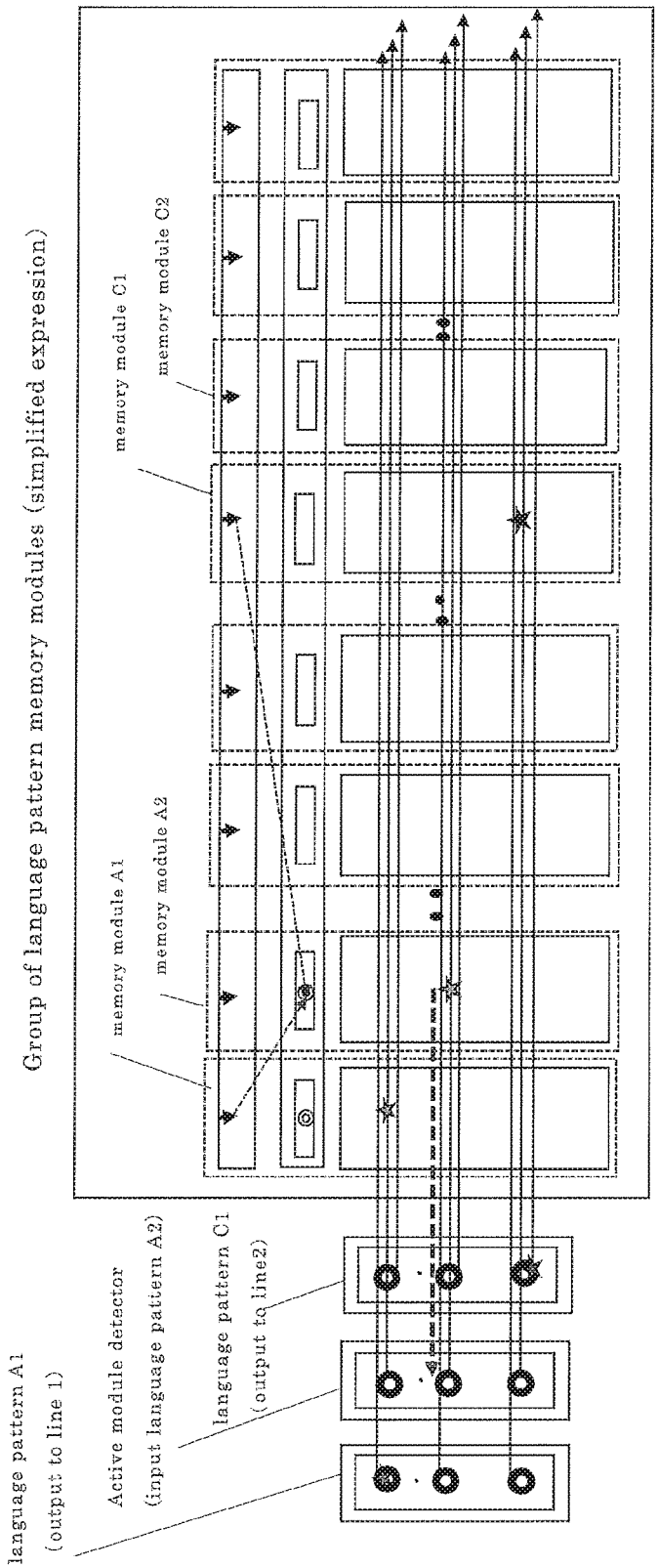
FIG. 12 shows an exemplary operation of the information analyzer (Analysis of the same meaning) (2/2).
Figure 13:
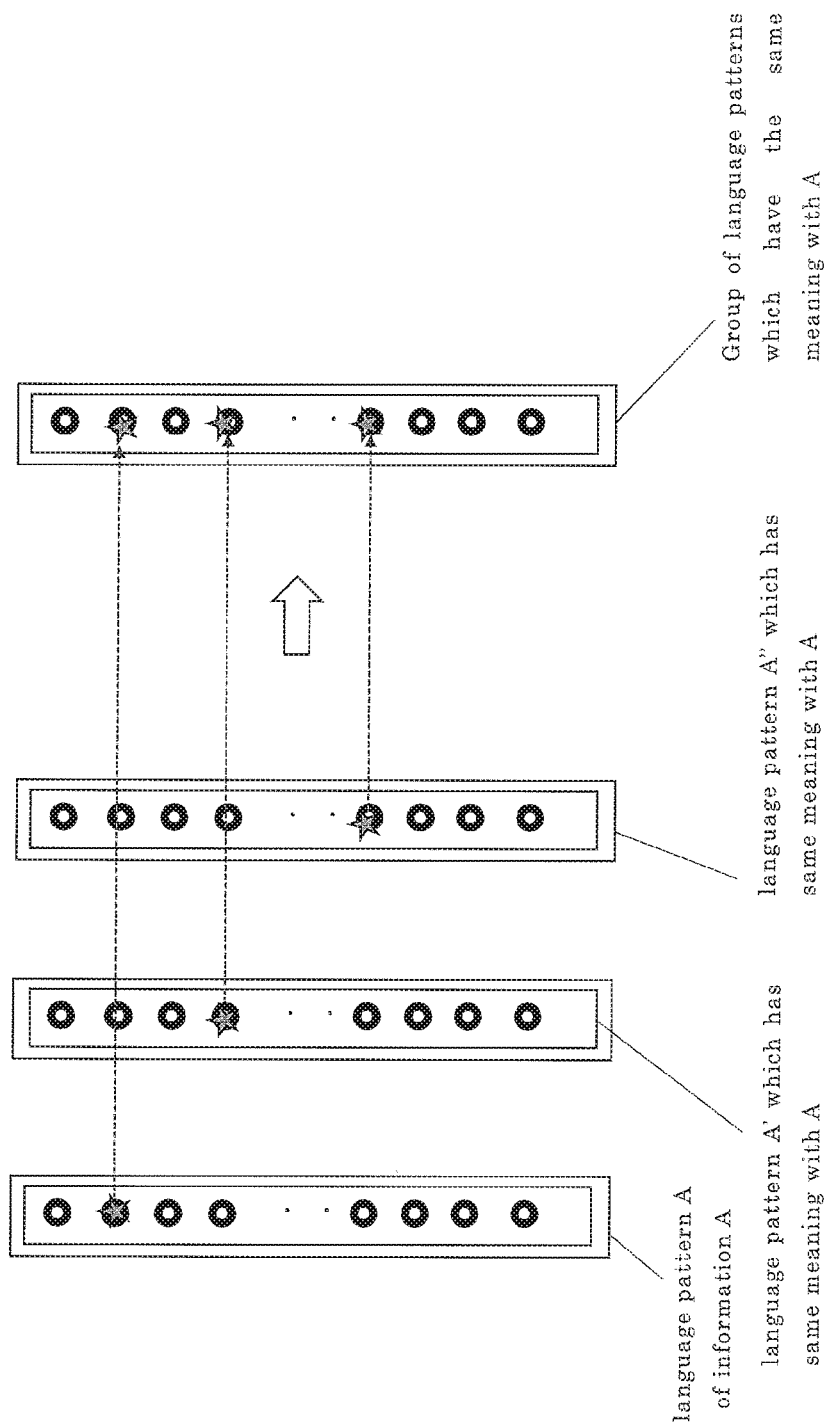
FIG. 13 shows an exemplary operation of the information analyzer (Group of the same meaning).
Figure 14:
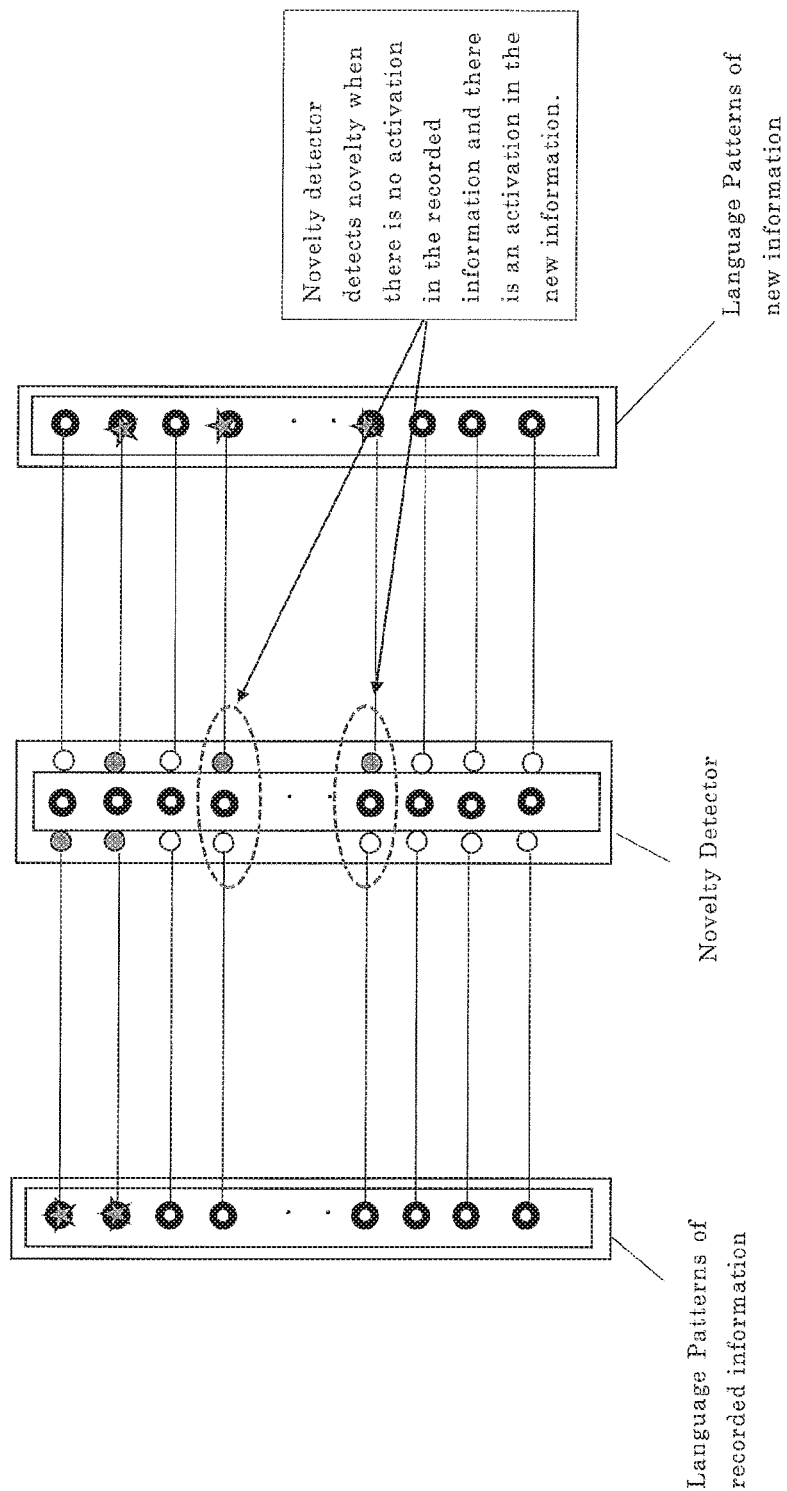
FIG. 14 shows an exemplary operation of the information analyzer (Detection of the novelty).
Figure 15:
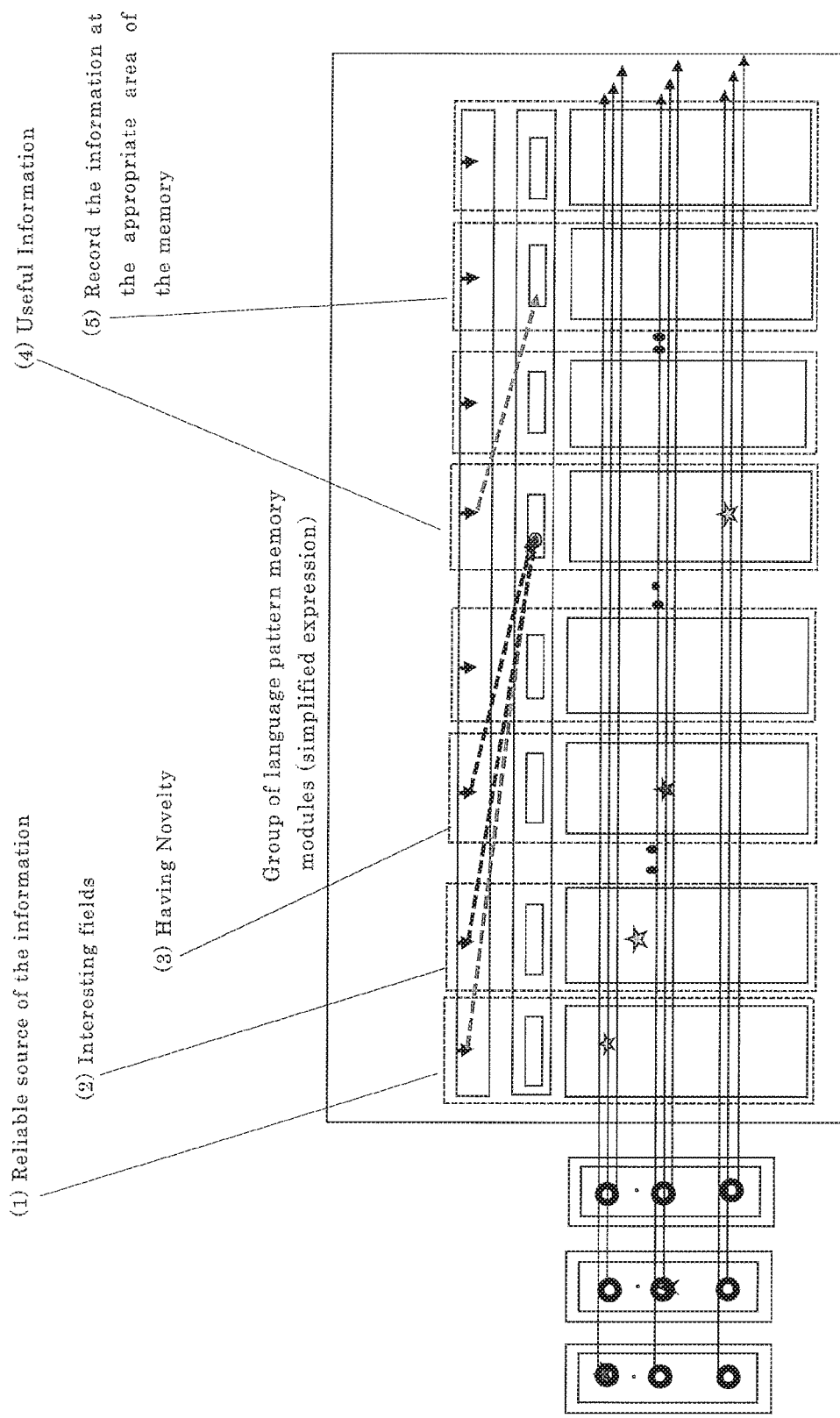
FIG. 15 shows an exemplary operation of the detecting and recording worthy information
Figure 16:
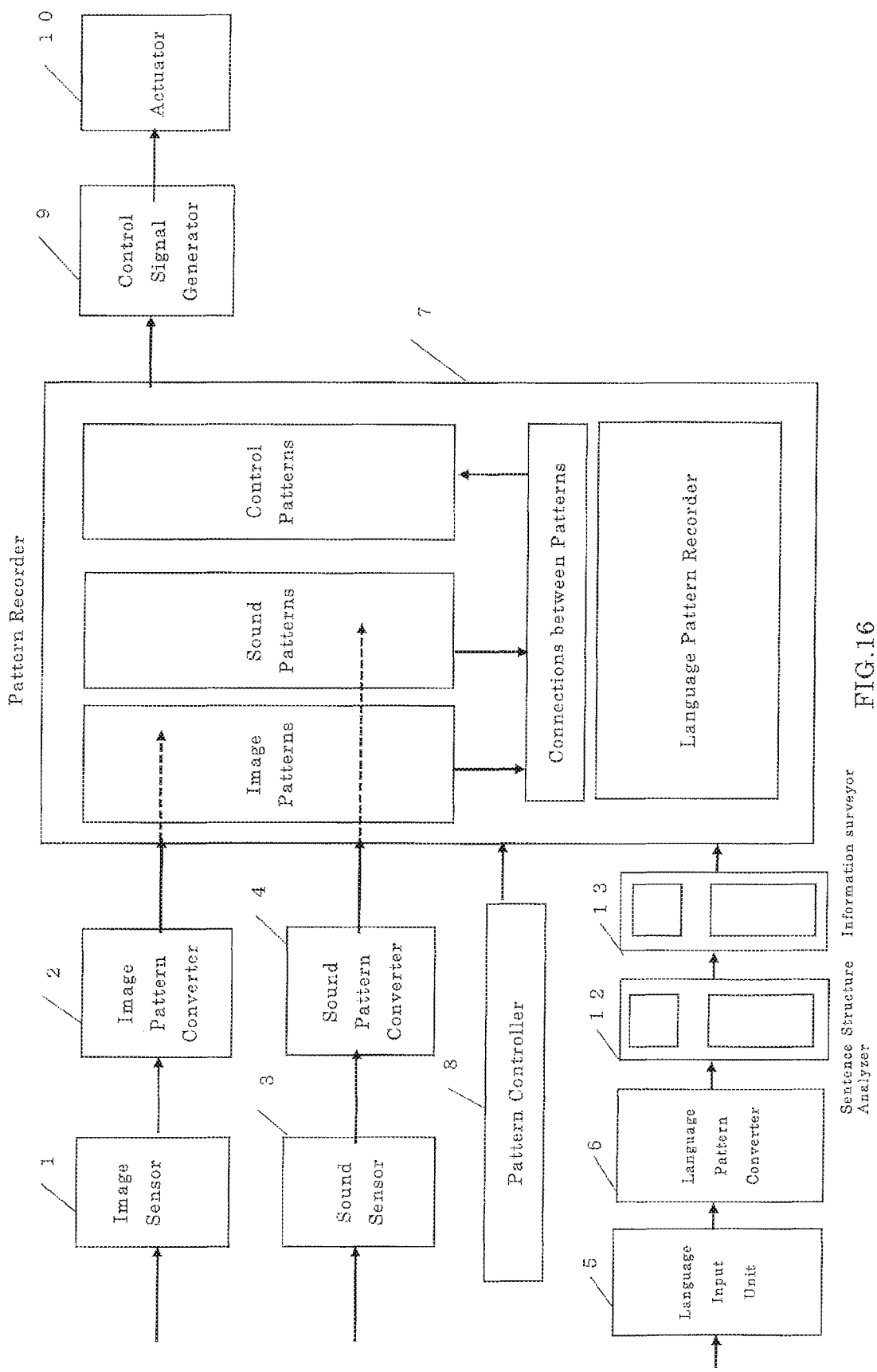
FIG. 16 shows an exemplary construction of the thinking pattern generator (Claim 3).
Figure 17:
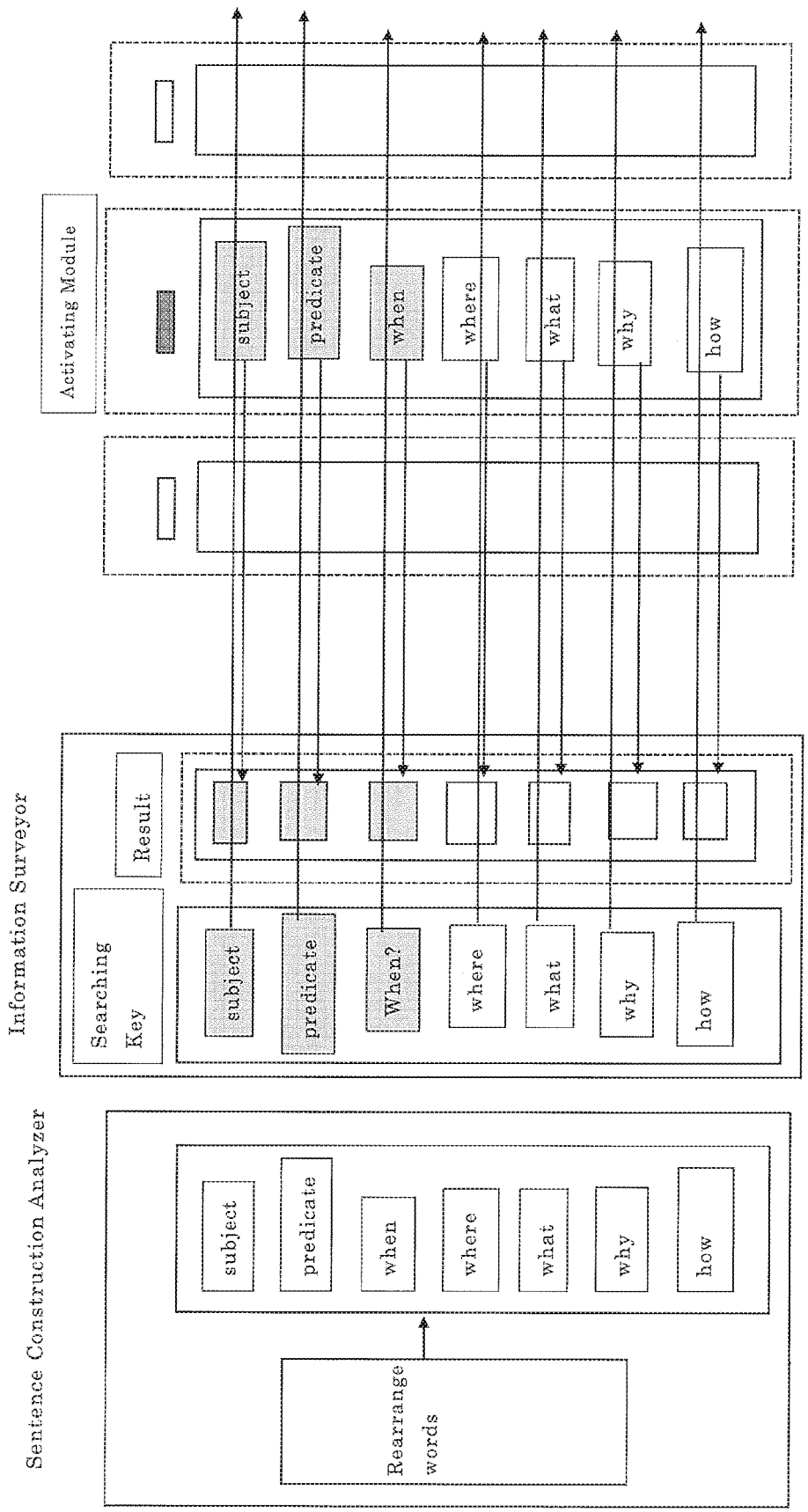
FIG. 17 shows an example of the language pattern generated by the sentence construction analyzer.
Figure 18:
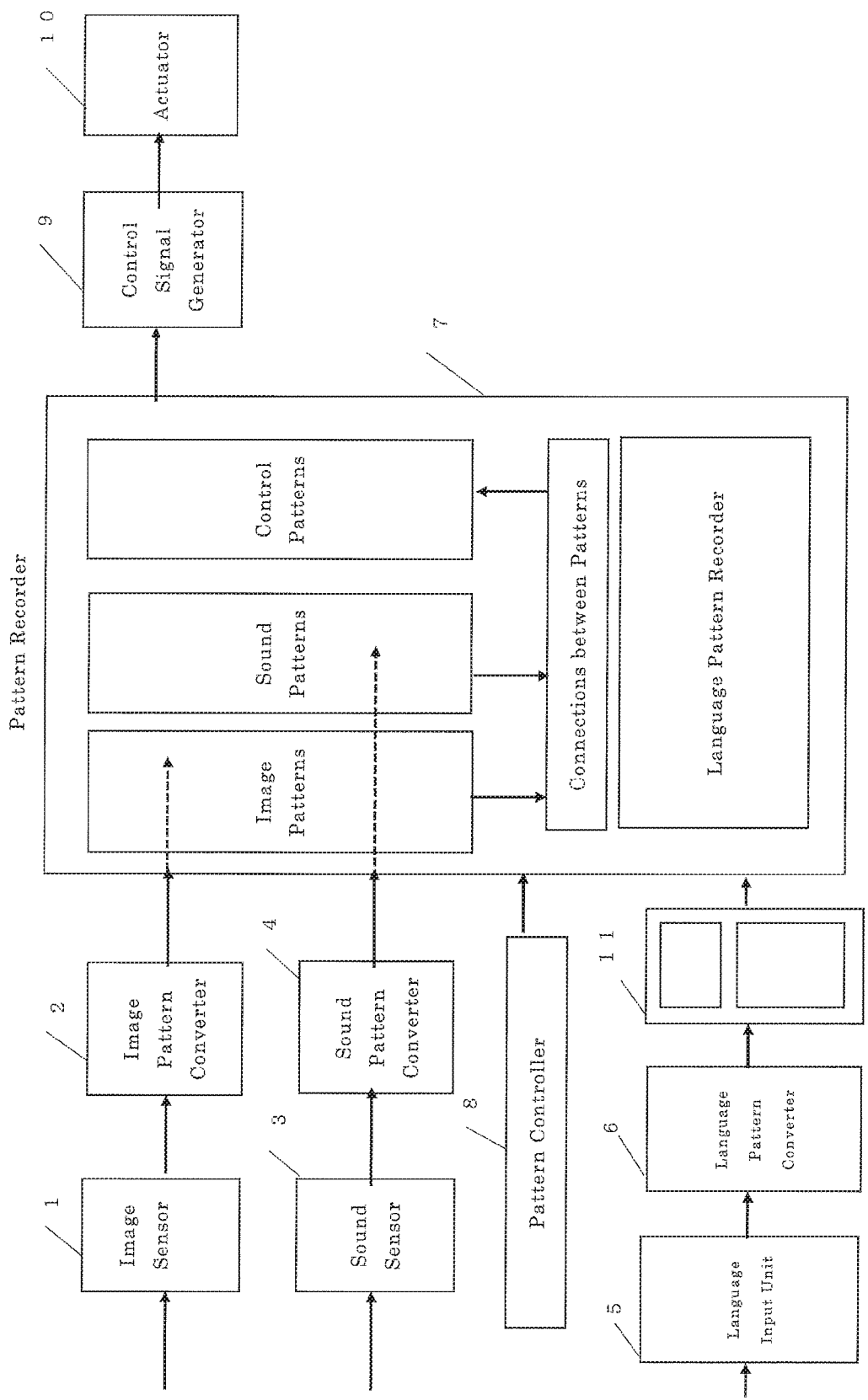
FIG. 18 shows an exemplary construction of the thinking pattern generator (Claim 4).
Figure 19:
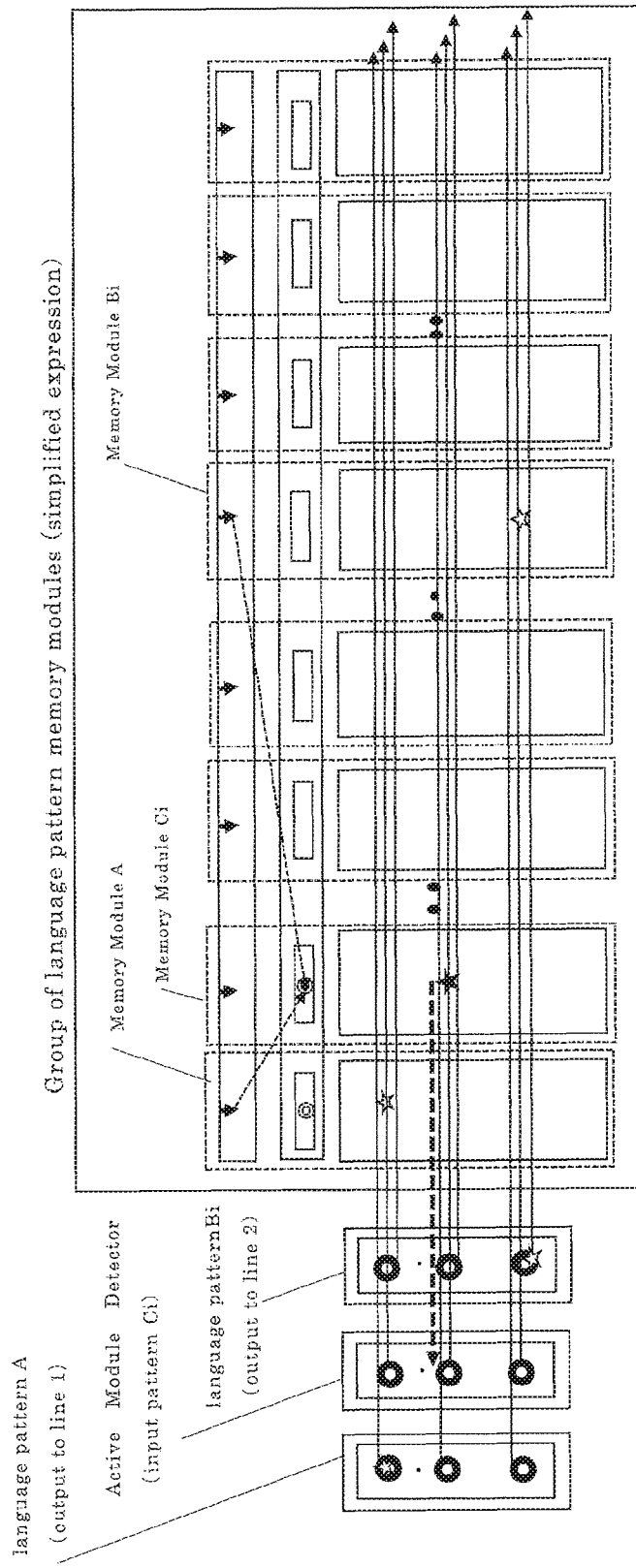
FIG. 19 shows an example of the patterns corresponding to combinations.
Figure 20:
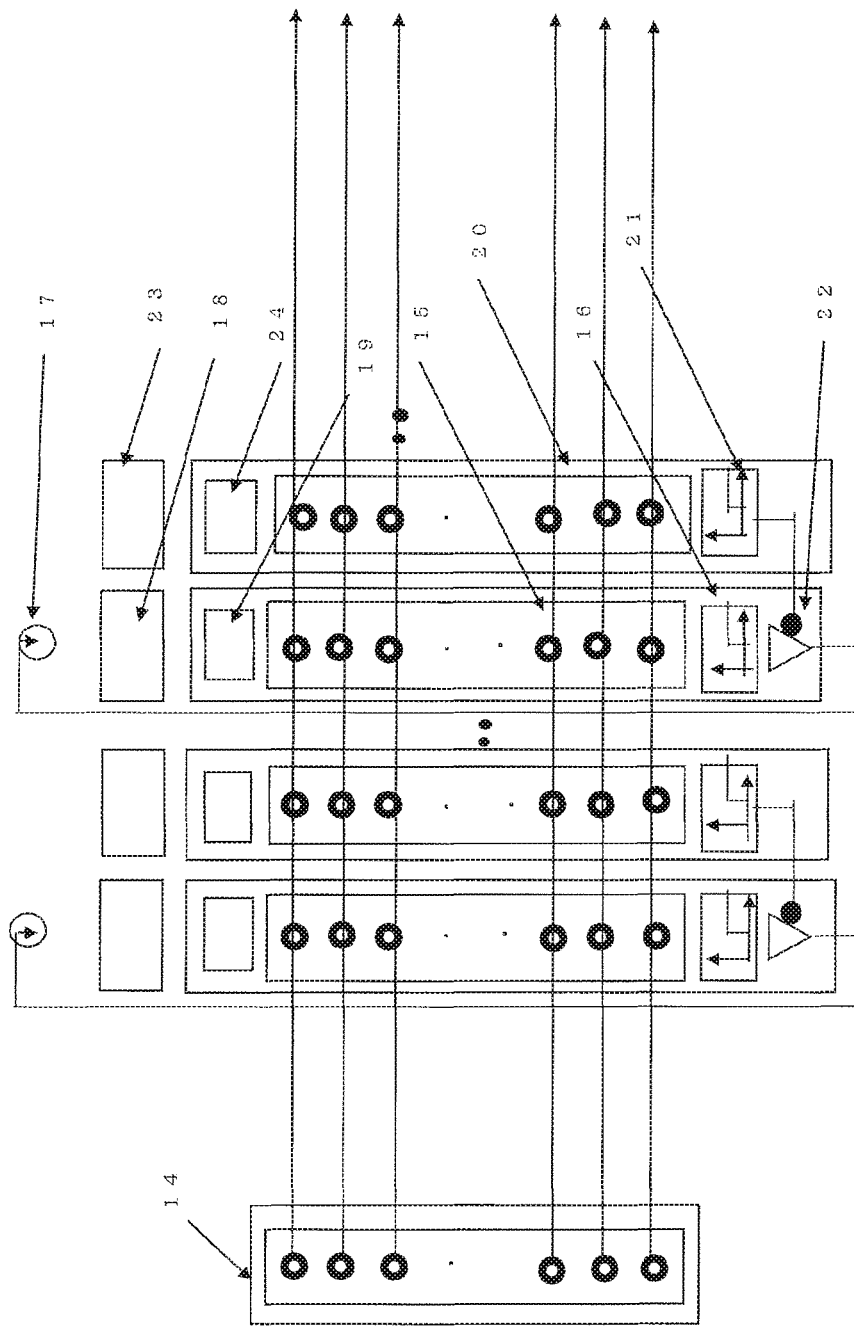
FIG. 20 shows an exemplary construction of the pattern recorder which avoids wrong pattern detection.
Figure 21:
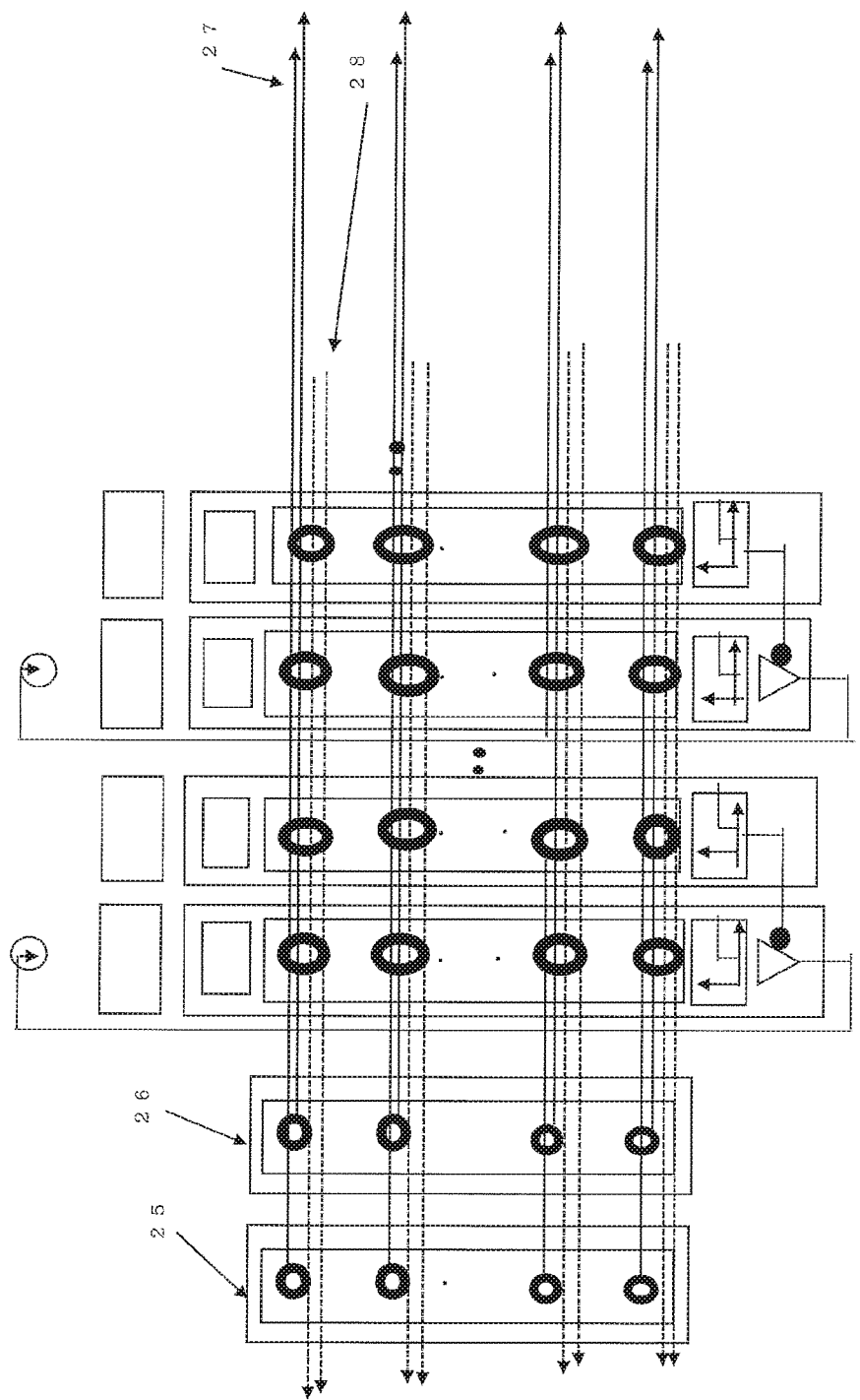
FIG. 21 shows an exemplary construction of the pattern recorder which avoid interference by multiple input patterns

LIST OF REFERENCE SIGNS 1 image sensor
2 image pattern converter
3 sound sensor
4 sound pattern converter
5 language input unit
6 language pattern converter
7 pattern recorder
8 pattern controller
9 control signal generator
10 actuator
11 information analyzer
13 information surveyor
14 pattern
15 active side pattern detector
16 active side threshold
17 module active unit
18 active side connection generator
19 active side pattern recorder
20 suppress side pattern detector
21 suppress side threshold
22 wrong detection suppressing unit
23 suppressive side connection generator
24 suppressive side pattern recorder
25 input pattern A
26 input pattern B
27 input lines
28 output lines

The invention claimed is:

1. An intellectual machine including a computer functioning as an autonomous thinking pattern generator, the computer being configured to:
  convert input information to patterns, the input information including image information, sound information or language;
  record the patterns into a pattern recorder;
  set and change the patterns, and form connective relations between the patterns; and
  convert the patterns into control signals, and output the control signals to control at least one device;
  wherein the computer is configured to
  convert input information to an image pattern if the input information is image information,
  convert input information to a sound pattern if the input information is sound information, and
  convert input information to a language pattern if the input information is language, and
  wherein the computer is configured to:
  connect the image pattern with a language pattern indicating a name of an object recognized by the image information,
  connect the sound pattern with a language pattern indicating a word or a sentence recognized by the sound information,
  connect a language pattern indicating one event with a language pattern indicating a reaction of the one event, and
  when image information that includes an image of a red traffic light is input,
  activate an image pattern corresponding to the input image information, activate a first language pattern which is connected to the activated image pattern and indicates language of a red traffic light recognized by the input image information, activate a second language pattern which is connected to the first language pattern and indicates a language of stop indicated by the first language pattern, and convert the second language pattern to a control signal which instructs the at least one device to stop.

2. The intellectual machine according to claim 1, wherein the computer is configured to evaluate at least one of:

from whom the input information is obtained;
to which field the input information is related; and
a relationship between the input information and the recorded information.

3. The intellectual machine according to claim 2, wherein the computer is configured to evaluate to which field the input information is related, or whether the input information is of interest based on a word or a sentence included in the input information.

4. The intellectual machine according to claim 2, wherein the computer is configured to evaluate consistency of the input information as the relationship between the input information and the recorded information.

5. The intellectual machine according to claim 2, wherein the computer is configured to classify the input information into one of a plurality of categories, based on a word included in the language, to evaluate the type of the input information.

6. The intellectual machine according to claim 1, wherein the computer is configured to:

detect a pattern related to the input information by checking the patterns recorded in the pattern recorder;
evaluate a relation between the detected pattern and a pattern corresponding to the input information;
form a connective relation based on the evaluation, and
wherein the pattern related to the input information includes a pattern which has a meaning opposite to the input information.

7. The intellectual machine according to claim 1, wherein:

a first pattern corresponding to input information related to a first event and a second pattern corresponding to input information related to a second event, different from the first event, are recorded in the pattern recorder, and when the second event happens after the first event happens, the computer is configured to (i) form a connective relation between the first pattern and the second pattern and, (ii) in response to an activation of the first pattern, cause the second pattern to be activated.

8. The intellectual machine according to claim 7, wherein the second event is an event caused by the first event, or an event suggested from the first event.

9. The intellectual machine according to claim 1, wherein the computer is configured to:

identify a part of speech of words included in the input information;

convert the input information into a language pattern in which the words are arranged in positions corresponding to subject, predicate and modifiers; and record the language pattern in the pattern recorder.

10. The intellectual machine according to claim 2, wherein, when the input information is converted into a language pattern and recorded, a reason of the input information, which is input along with the input information, is converted into the language pattern and recorded, and groups of language patterns which show the reasons are constructed, and wherein the computer is configured to search the groups of language patterns which show the reasons, and to determine the validity of a reason of the input information based on the number of the matching results.

* * * * *